US012203636B2

(12) United States Patent
Ernst et al.

(10) Patent No.: US 12,203,636 B2
(45) **Date of Patent: *Jan. 21, 2025**

(54) SOLID-STATE LIGHT EMITTER LIGHTING APPARATUS AND METHOD OF OPERATING THE SAME

(71) Applicant: Astera Manufacturing Limited, Shenzhen (CN)

(72) Inventors: Norbert Ernst, Shenzhen (CN); Simon Canins, Shenzhen (CN)

(73) Assignee: Astera Manufacturing Limited, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/444,749

(22) Filed: Feb. 18, 2024

(65) Prior Publication Data

US 2024/0210022 A1 Jun. 27, 2024

Related U.S. Application Data

(63) Continuation-in-part of application No. 18/323,431, filed on May 25, 2023, now Pat. No. 11,906,116.

(30) Foreign Application Priority Data

Jun. 1, 2022 (CN) ........................ 202221358295.6

(51) Int. Cl.

| | |
|---|---|
| ***F21V 23/00*** | (2015.01) |
| ***F21V 15/01*** | (2006.01) |
| ***H05B 47/19*** | (2020.01) |
| *F21Y 115/10* | (2016.01) |

(52) U.S. Cl.

CPC ............ *F21V 23/006* (2013.01); *F21V 15/01* (2013.01); *H05B 47/19* (2020.01); *F21Y 2115/10* (2016.08)

(58) Field of Classification Search

CPC . F21K 9/90; F21K 9/237; F21K 9/238; F21K 9/65; F21V 23/0471

See application file for complete search history.

(56) References Cited

U.S. PATENT DOCUMENTS

| | | | | |
|---|---|---|---|---|
| 11,060,711 | B1 * | 7/2021 | Illouz ...................... | F21S 2/005 |
| 11,272,599 | B1 | 3/2022 | Lewis et al. | |
| 2013/0009551 | A1 | 1/2013 | Knapp | |
| 2016/0366746 | A1 | 12/2016 | van de Ven et al. | |
| 2017/0156189 | A1 | 6/2017 | Jayawardena et al. | |
| 2017/0359643 | A1 | 12/2017 | Saha et al. | |
| 2018/0073686 | A1 | 3/2018 | Quilici et al. | |

* cited by examiner

*Primary Examiner* — Elmito Breval

(74) *Attorney, Agent, or Firm* — Idea Intellectual Limited; Margaret A. Burke; Sam T. Yip

(57) ABSTRACT

Provided are a solid-state lighting apparatus composed of a plurality of solid-state lighting units. Each solid-state lighting unit includes inter-unit communication modules, each module located on a corresponding side of the solid-state lighting unit and configured to communicate and interlock with an inter-unit communication module of a corresponding adjacent lighting unit connected to the lighting unit on the corresponding side. The invention allows flexible combination and convenient installation/rearrangement of lighting equipment to satisfy requirements for different lighting areas and working modes.

9 Claims, 31 Drawing Sheets

1A/1B

1A/1B

1A/1B

SOLID-STATE LIGHT EMITTER LIGHTING APPARATUS AND METHOD OF OPERATING THE SAME

CROSS-REFERENCES TO OTHER DOCUMENTS

This application is a continuation in part of U.S. patent application Ser. No. 18/323,431 filed 25 May 2023, which claims priority to China Patent Application no. 202221358295.6 filed 1 Jun. 2022; the disclosure of which are incorporated herein by reference in their entireties.

FIELD OF THE INVENTION

The present invention relates to the technical field of solid-state luminous body lighting, more specifically, to a matrix light-emitting diode (LED) lighting apparatus and a method of operating the same.

BACKGROUND OF THE INVENTION

LEDs are widely used in the field of lighting due to their high luminous efficiency, stable performance, low heat dissipation, and long service life. However, because the light emitted by the LED is divergent, the light irradiation distance is limited and the irradiation intensity in the effective irradiation area is not very high. Consequently, using LEDs to create spotlights still presents several technical challenges. In addition, in some large-scale activities and projects, lighting equipment needs to be installed and dismantled quickly, and different application scenarios have varying requirements for lighting area and working mode.

SUMMARY OF THE INVENTION

In order to address the above-mentioned technical challenges of LEDs in the prior art, namely their limited irradiation distance and relatively low irradiation intensity in the effective irradiation area, and to meet the demand for short-term installation and disassembly of lighting equipment in various scenarios, the present invention allows flexible combination and convenient installation/rearrangement of lighting equipment to satisfy the requirements for different lighting areas and working modes.

According to a first aspect of the present invention, provided is a solid-state lighting unit capable of communicating with one or more adjacent lighting units. The solid-state lighting unit comprises: a housing; a front cover arranged on a front side of the housing; a plurality of light sources arranged on a circuit board; a control panel arranged on a back side of the housing; a driving module electrically connected to the plurality of light sources; one or more inter-unit communication modules, each located on a corresponding side of the solid-state lighting unit and configured to communicate with an inter-unit communication module of a corresponding adjacent lighting unit connected to the lighting unit on the corresponding side; one or more male interlocking assemblies, each located on a corresponding side of the solid-state lighting unit and configured to interlock with a female interlocking assembly of a corresponding adjacent lighting unit connected to the solid-state lighting unit on the corresponding side; and one or more female interlocking assemblies, each located on a corresponding side of the solid-state lighting unit and configured to interlock with a male interlocking assembly of a corresponding adjacent lighting unit connected to the solid-state lighting unit on the corresponding side.

DETAILED DESCRIPTION

The present invention is described in further detail below in conjunction with accompanying drawing and specific embodiments.

Figure 1A:
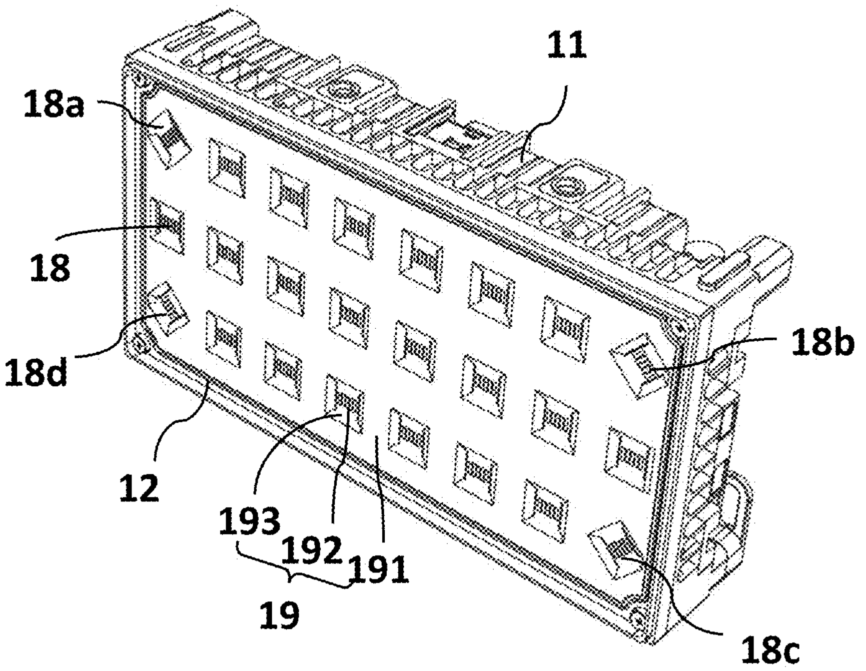
FIGS. 1A, 1B and 1C show a front perspective view, a rear perspective view and an exploded view of a solid-state lighting unit communicable with adjacent lighting units according to an embodiment of the present invention respectively.
Figure 1B:
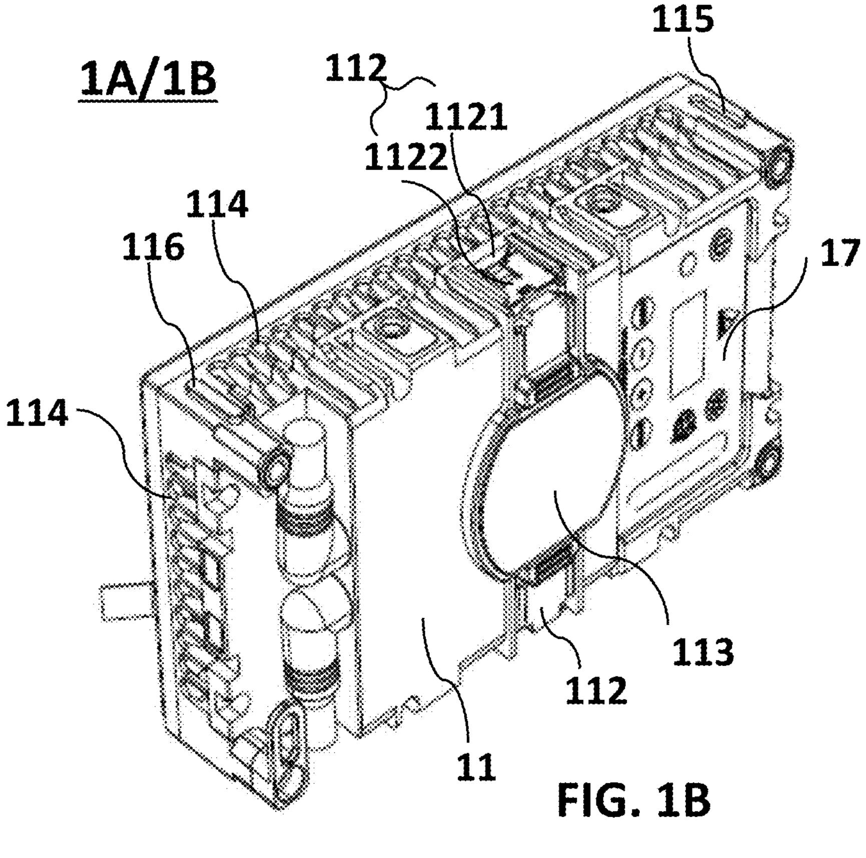
Figure 1C:
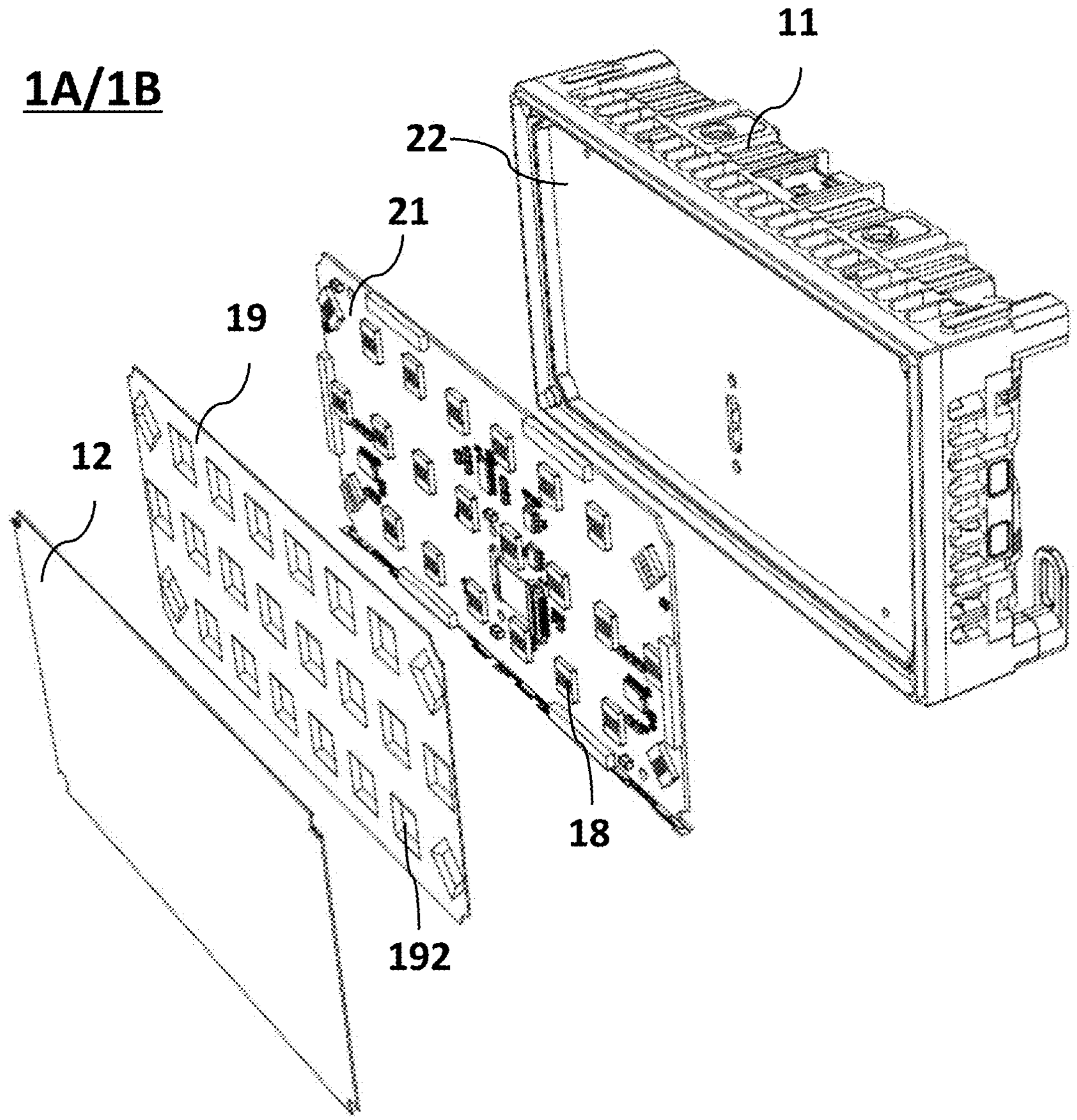

FIGS. 1A, 1B and 1C show a front perspective view, a rear perspective view and an exploded view of a solid-state lighting unit communicable with adjacent lighting units according to an embodiment of the present invention respectively.

Figure 2A:
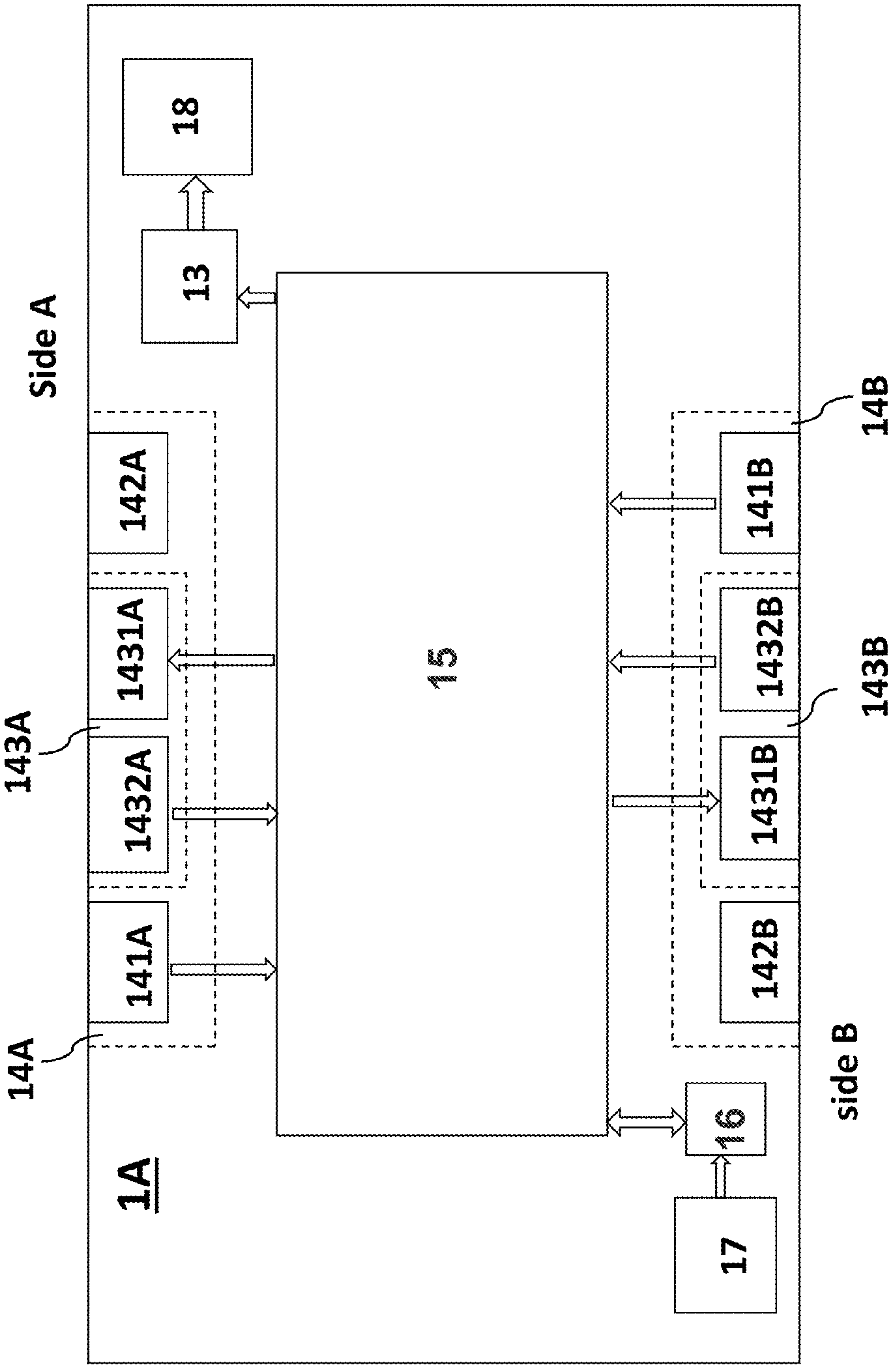
FIG. 2A shows a block diagram of a solid-state lighting unit according to one embodiment of the present invention.

FIG. 2A shows a block diagram of a solid-state lighting unit 1A according to one embodiment of the present invention. Referring to FIGS. 1A-1C and 2A, solid-state lighting unit 1A may include: housing 11, front cover 12, driving module 13, inter-unit communication modules 14A-14B, microprocessor 15, control communication module 16, control panel 17 and a plurality of light sources 18. The front cover 12 is arranged on front side of the housing 11. The material of the housing 11 can be any plastic suitable for injection molding. The interface between the housing 11 and the front cover 12 can be sealed by a sealing ring. Accessory shoes 112 may be arranged on upper and lower sides of the housing 11, respectively. Each accessory shoe 112 includes a slot 1121 for receiving accessory connection and a spring tensioner 1122 for locking the accessory connection.

The driving module 13, the inter-unit communication modules 14A-14B, the microprocessor 15, the control communication module 16 and the plurality of light sources 18 are arranged on a metal circuit board 21. The control panel 17 is disposed on the back of the housing 11.

The plurality of light sources 18 can be arranged in a two-dimensional array. Light sources 18*a*-18*d* at the four corners of the array are oriented at an angle of 45° so that the light intensity distribution of the entire light source array is more uniform. Each light source 18 may comprise a plurality of LEDs with different spectra to form a uniform visible color spectrum to mitigate the influence of wavelength peaks. For example, each light source 18 can be formed of five LED chips of different colors. The five LED chips may include red LEDs, green LEDs, fluorescent green LEDs, blue LEDs, and fluorescent amber LEDs.

The solid-state lighting unit 1A may further include a reflective plate 19 disposed between the front cover 12 and the circuit board 21. The reflective plate 19 has a plane 191 and a plurality of windows 192 protruding from the plane 191, corresponding to the positions of the plurality of light sources 18 respectively. Each window has an inclined reflective surface 193 on its periphery, extending from the edge of the window 192 to the plane 191, for reflecting and diffusing the light emitted by the plurality of light sources 18.

The solid-state lighting unit 1A may also include a built-in heat sink 22, which is bonded with the metal circuit board 21 through heat-dissipating glue. The material of the heat sink 22 can be any metal or alloy with high thermal conductivity, such as aluminum. Each side of the housing 11 may include a plurality of ventilation holes 114 to cooperate with the heat sink pins of the heat sink 22 to perform the heat dissipation function more effectively. The solid-state lighting unit 1A may further include a magnet 113 disposed at the center of the back of the housing 11 to allow the solid-state lighting unit 1A to be easily attached to a (magnetic) metal surface.

The driving module 13 is electrically connected to the plurality of light sources 18. Inter-unit communication modules 14A-14B are located on opposite sides A and B, respectively, of solid-state lighting unit 1A and are configured to communicate with inter-unit communication modules (not shown) of corresponding adjacent lighting units connected to the lighting unit 1A on respective sides.

Inter-unit communication modules 14A-14B may include presence detectors 141A-141B, respectively, for detecting the presence of corresponding adjacent lighting units. Inter-unit communication modules 14A-14B may also include presence indicators 142A-142B, respectively, for indicating the presence of a lighting unit to corresponding adjacent lighting units.

Inter-unit communication modules 14A-14B may also include optical transceivers 143A-143B, respectively, for communicating with corresponding optical transceivers (not shown) in corresponding adjacent lighting units. The optical transceiver 143A includes a transmitter 1431A and a receiver 1432A. The optical transceiver 143B includes a transmitter 1431B and a receiver 1432B.

The microprocessor 15 is electrically connected to the driving module 13 and the inter-unit communication modules 14A-14B and is configured to control the inter-unit communication modules 14A-14B respectively so that: when the corresponding presence detector of each inter-unit communication module detects the presence of a corresponding adjacent lighting unit, the inter-unit communication module is activated; when the presence detector corresponding to each inter-unit communication module does not detect the presence of the corresponding adjacent lighting unit, the inter-unit communication module is deactivated. In this way, it is possible to prevent the inter-unit communication module from sending out signals when the lighting unit 1A is used alone or not connected to adjacent lighting units on the corresponding side of the inter-unit communication module, causing interference to other nearby lighting units.

The control communication module 16 is electrically connected to the microprocessor 15 and configured to: receive the control signal; decode the control signal into a control command; and transmit the control command to the microprocessor 15. The control communication module 16 is configured to be electrically connected to the control panel 17 and to receive the control signals from the control panel. The control communication module 16 may also include a wireless communication module for receiving external wireless control signals; and/or a wired communication module for receiving external wired control signals. The wireless control signal can come from an external controller, such as a dedicated remote control or a smart device installed with a dedicated application. The wireless communication module can be configured to support various communication technologies, such as Bluetooth, WiFi and zigbee . . . etc. The wired communication module can be configured to receive wired control signals superimposed with DMX data signals through DMX data lines or power lines.

The microprocessor 15 is further configured to: receive a control command from the control communication module 16; and transmit the control command to the activated optical transceiver to forward the control command to the corresponding adjacent lighting unit.

The lighting unit 1A may be powered by a built-in battery or an external power supply. The lighting unit 1A may also include an electrical socket for conveniently connecting to a power source to provide continuous power supply or to charge the built-in battery. The electrical socket can also be used with a dedicated charging stand or case to prevent short circuits and reverse polarity power connections when the lighting unit 1A is being charged. The lighting unit 1A can also be connected to other lighting units in a daisy chain format through a power line superimposed with DMX data signals to form a single lighting unit for operation and control.

Figure 2B:
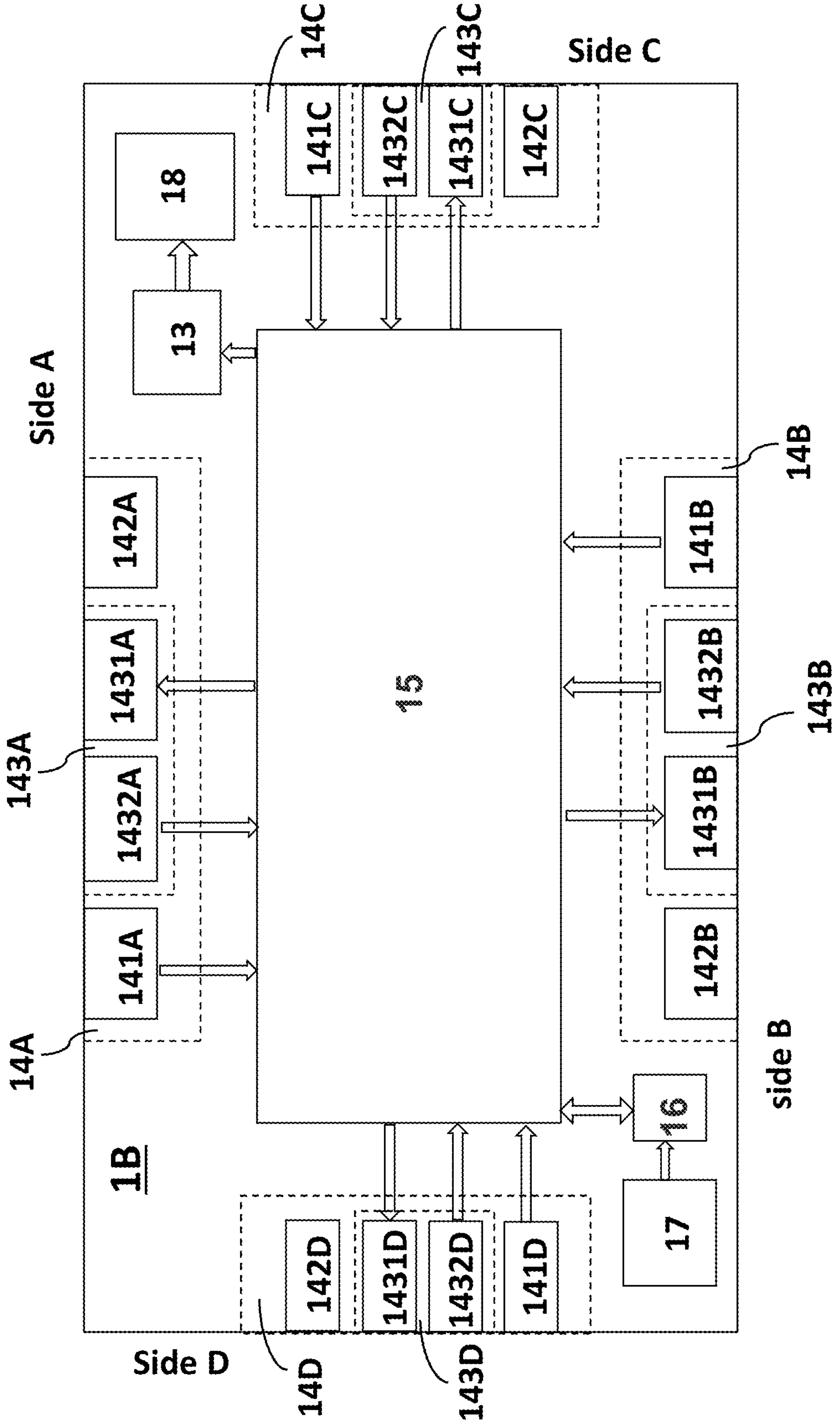
FIG. 2B shows a block diagram of a solid-state lighting unit according to another embodiment of the present invention.

FIG. 2B shows a block diagram of a solid-state lighting unit 1B according to another embodiment of the present invention. Referring to FIGS. 1A-1C and 2B, solid-state lighting unit 1B is similar to solid-state lighting unit 1A. The difference between the solid-state lighting unit 1B and the solid-state lighting unit 1A is that the solid-state lighting unit 1B includes four inter-unit communication modules 14A-14D, respectively located on four sides A-D of the solid-state lighting unit 1B and configured to be connected to inter-unit communication modules of adjacent lighting units on corresponding sides of the lighting unit 1B to communicate with the adjacent lighting units.

Inter-unit communication modules 14A-14D may include presence detectors 141A-141D, respectively, for detecting the presence of corresponding adjacent lighting units. Inter-unit communication modules 14A-14D may also include presence indicators 142A-142D, respectively, for indicating the presence of lighting unit 1B to corresponding adjacent lighting units.

Inter-unit communication modules 14A-14D may also include optical transceivers 143A-143D, respectively, for communicating with optical transceivers in corresponding adjacent lighting units. The optical transceiver 143A includes a transmitter 1431A and a receiver 1432A. The optical transceiver 143B includes a transmitter 1431B and a receiver 1432B. The optical transceiver 143C includes a transmitter 1431C and a receiver 1432C. The optical transceiver 143D includes a transmitter 1431D and a receiver 1432D.

In some embodiments, presence indicators 142A-142D may be magnets and presence detectors 141A-141D may be Hall effect sensors. Optical transceivers 143A-143D may be any transceiver suitable for exchanging optical signals over short distances in free space. In some embodiments, optical transceivers 143A-143D may be infrared transceivers. In some embodiments, the optical transceivers 143A-143D may communicate with corresponding optical transceivers in adjacent lighting units based on a universal asynchronous transceiver (UART) communication protocol.

Figure 3A:
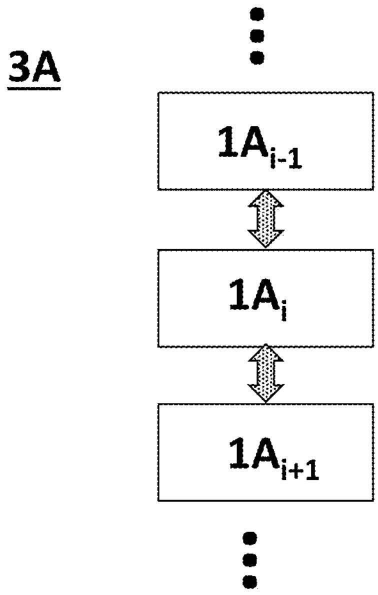
FIG. 3A shows a solid-state lighting apparatus comprising a plurality of solid-state lighting units of FIG. 2A.

FIG. 3A shows a schematic diagram of a solid-state lighting apparatus 3A composed of a plurality of solid-state lighting units $1A_i$, i=1, . . . , M, where M is a positive integer. The plurality of solid-state lighting units $1A_i$ are arranged side by side to form a one-dimensional array. Each solid-state lighting unit $1A_i$ can communicate with two adjacent solid-state lighting units respectively through two inter-unit communication modules. For example, unit $1A_i$ can communicate with unit $1A_{i-1}$ and unit $1A_{i+1}$ respectively through the inter-unit communication module. In this way, the user can control the connected solid-state lighting units through the control panel of any one of the connected solid-state lighting units. Alternatively, the user can control the connected solid-state lighting units by communicating with the control communication module of any one of the connected solid-state lighting units through a remote control or smart device.

The plurality of solid-state lighting units $1A_i$ in the solid-state lighting apparatus 3A can be operated and controlled as a single lighting unit and configured to work in a synchronous mode or a chain-effect mode. In the synchronous mode, the plurality of solid-state lighting units $1A_i$ respond synchronously to commands input by the user. In the chain-effect mode, the plurality of solid-state lighting units $1A_i$ are configured to sequentially respond to user input commands to achieve some dynamic lighting or animation effects. When the plurality of solid-state lighting units $1A_i$ work in the chain-effect mode, the control communication module in each solid-state lighting unit is configured to sequentially set the DMX address for the lighting units.

Figure 3B:
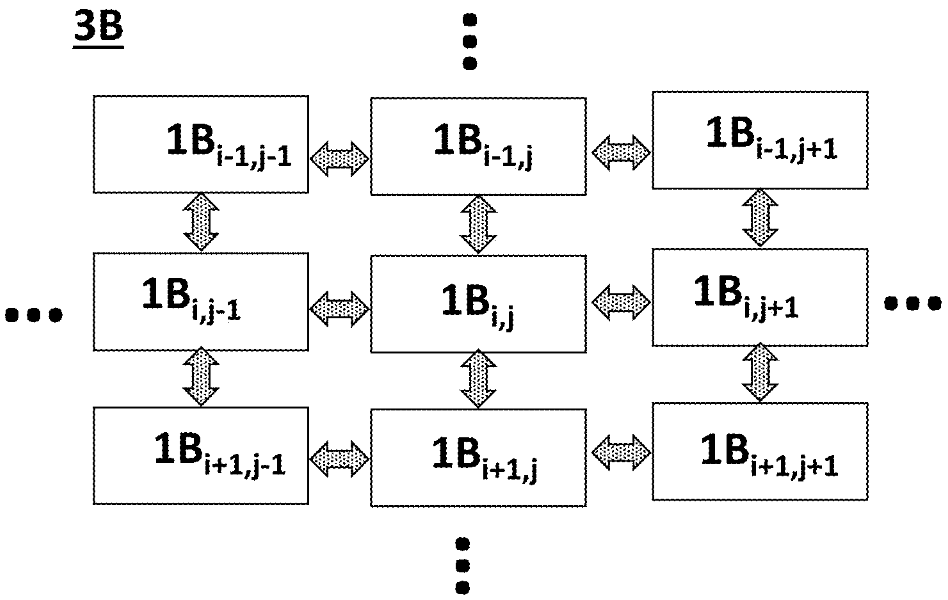
FIG. 3B shows a solid-state lighting apparatus comprising a plurality of solid-state lighting units of FIG. 2B.

FIG. 3B shows a schematic diagram of a solid-state lighting apparatus 3B composed of a plurality of solid-state lighting units $1B_{i,j}$, i=1, . . . , M, and j=1, . . . , N, wherein N and M are positive integers. The plurality of solid-state lighting units $1B_{i,j}$ are arranged side by side to form a two-dimensional array. Each of solid-state lighting unit $1B_{i,j}$ can communicate with four adjacent solid-state lighting units respectively through four inter-unit communication modules. For example, unit $1B_{i,j}$ can communicate with unit $1B_{i-1,j}$, unit $1B_{i+1,j}$, unit $1B_{i,j-1}$ and unit $1B_{i,j+1}$ respectively through the inter-unit communication module. In this way, the user can control the connected solid-state lighting units through the control panel of any one of the connected solid-state lighting units. Alternatively, a user may operate the connected solid-state lighting units by communicating with the control communication module 16 of any one of the connected solid-state lighting units through a remote control or smart device.

The plurality of solid-state lighting units $1B_{i,j}$ in the solid-state lighting apparatus 3B can be operated and controlled as a single lighting unit and configured to work in a synchronous mode or a chain effect mode. In the synchronous mode, the plurality of solid-state lighting units $1B_{i,j}$ respond to commands input by the user synchronously. In the chain-effect mode, the plurality of solid-state lighting units $1B_{i,j}$ are configured to sequentially respond to user input commands to achieve some dynamic lighting or animation effects. When the plurality of solid-state lighting units $1B_{i,j}$ work in the chain-effect mode, the control communication module in each solid-state lighting unit is configured to sequentially set the DMX address for the lighting units.

Figure 4:
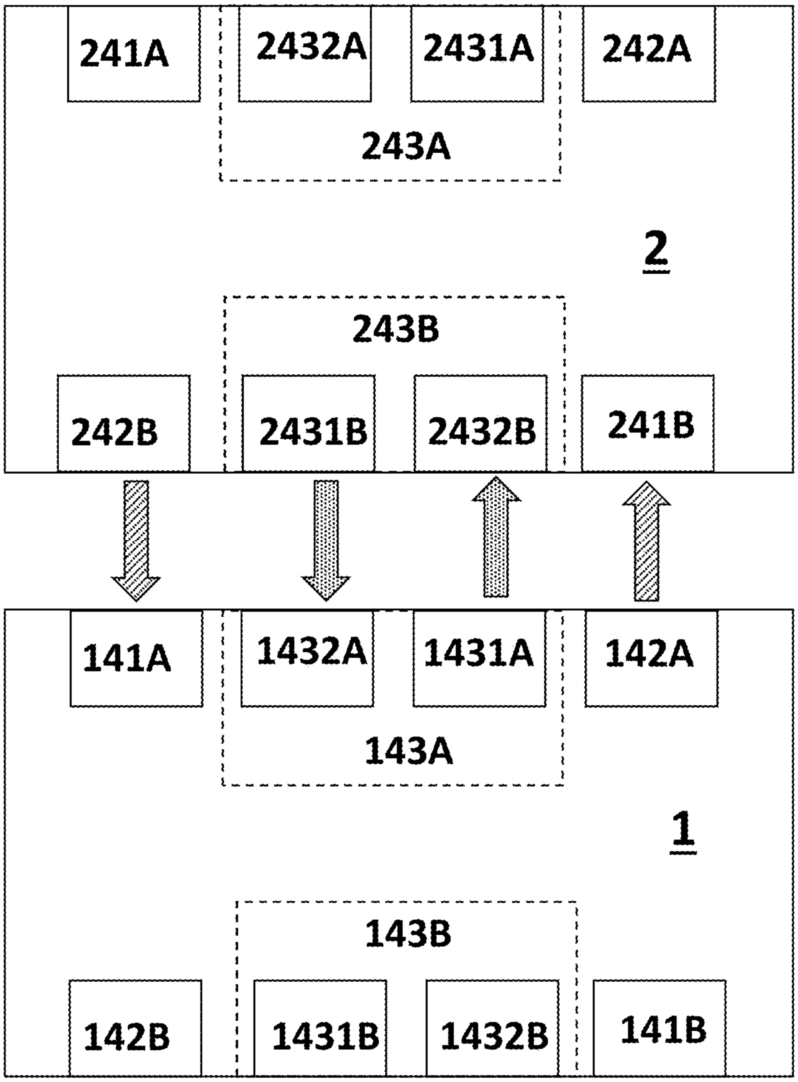
FIG. 4 shows a schematic diagram of how two adjacent solid-state lighting units communicate with each other according to some embodiments of the present invention.

FIG. 4 shows a schematic diagram of how two solid-state lighting units 1 and 2 communicate with each other. As shown in FIG. 4, when the lighting unit 2 approaches the lighting unit 1 from side A of the lighting unit 1, the presence detector 141A on side A of the lighting unit 1 will sense a signal emitted by presence indicator 242B on side B of the lighting unit 2, thereby detect the presence of the lighting unit 2. After presence detector 141A detects the presence of lighting unit 2, optical transceiver 143A on side A of lighting unit 1 is activated to communicate with optical transceiver 243B on side B of lighting unit 2. More specifically, the transmitter 1431A is activated to transmit a signal to the receiver 2432B; and the receiver 1432A is activated to receive the signal transmitted by the transmitter 2431B.

On the other hand, the presence detector 241B on the B side of the lighting unit 2 will sense a signal from the presence indicator 142A on the A side of the lighting unit 1, thereby detect the presence of the lighting unit 1. After presence detector 241B detects the presence of lighting unit 1, optical transceiver 243B on side B of lighting unit 2 is activated to communicate with optical transceiver 143A on side A of lighting unit 1. More specifically, the transmitter 2431B is activated to transmit a signal to the receiver 1432A; and the receiver 2432B is activated to receive the signal transmitted by the transmitter 1431A.

In the case where presence indicators 142A-142D are magnets and presence detectors 141A-141D are Hall-effect sensors, when lighting unit 2 approaches lighting unit 1 from side A of lighting unit 1, the Hall-effect sensor on the side A of the lighting unit 1 will sense magnetic field changes caused by the magnet on side B of the lighting unit 2, thereby detect the presence of the lighting unit 2. On the other hand, when lighting unit 1 approaches the lighting unit 2 from side B of the lighting unit 2, the Hall effect sensor on the B side of the lighting unit 2 will sense magnetic field changes caused the magnet on the A side of the lighting unit 1, thereby detect the presence of lighting units 1.

Figure 5A:
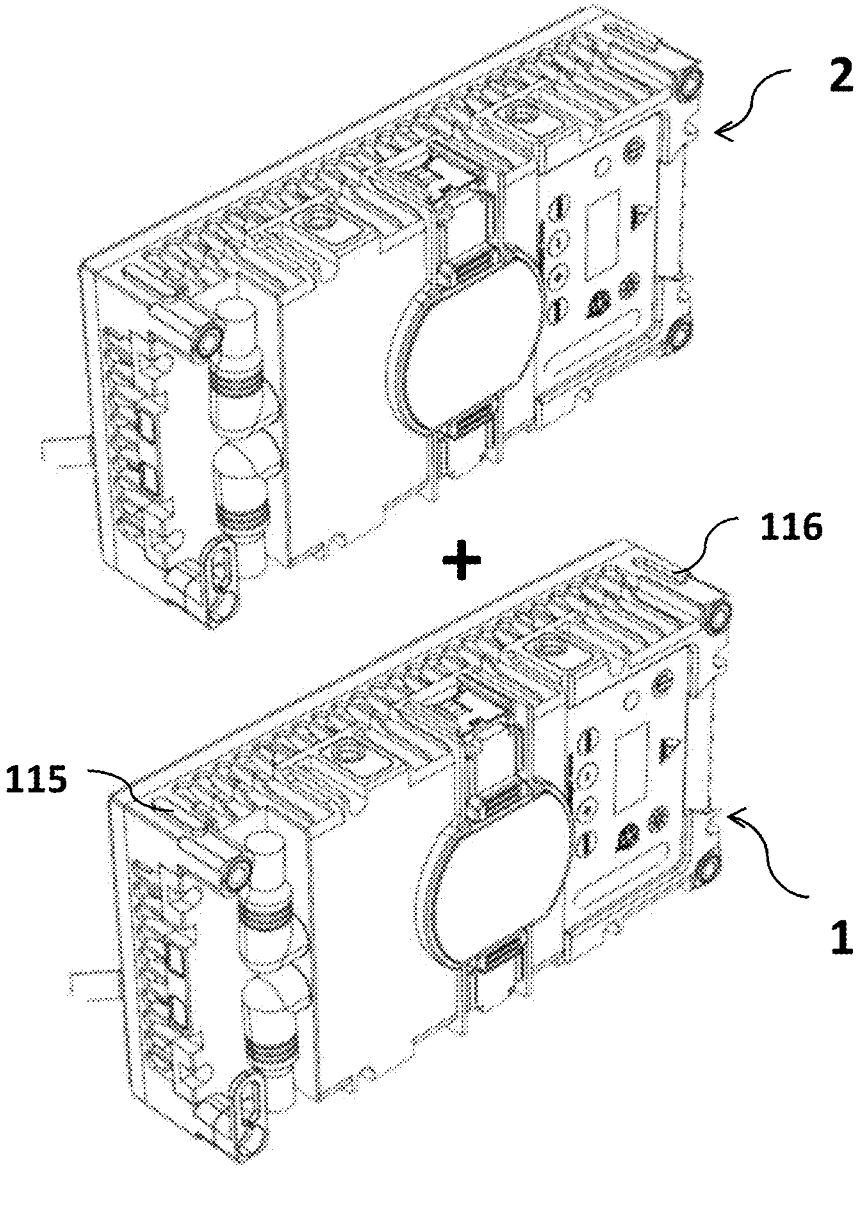
FIGS. 5A-5B show schematic diagrams of how two adjacent solid-state lighting units are mechanically connected according to some embodiments of the present invention.
Figure 5B:
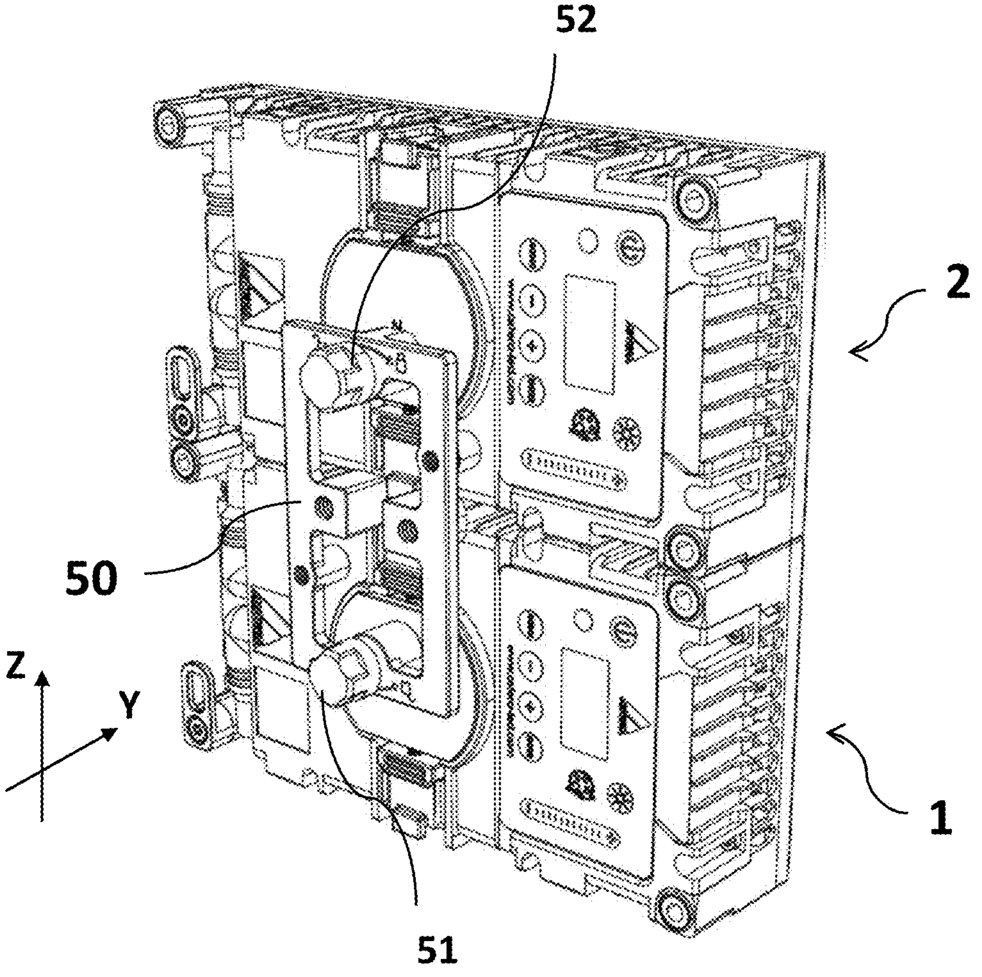

FIGS. 5A and 5B show schematic diagrams of how two adjacent solid-state lighting units 1 and 2 are mechanically connected according to some embodiments of the present invention. Referring to FIG. 5A, the housing 11 of the solid-state lighting unit 1 may include grooves 115 and protrusions 116, which cooperate with corresponding protrusions and grooves (not shown) on the housing of the solid-state lighting unit 2, respectively, to prevent the solid-state lighting units 1 and 2 from mutually shifting after assembling. Referring to FIG. 5B, any two adjacent solid-state lighting units 1 and 2 can be mechanically connected through a mechanical connector 50.

Figure 6:
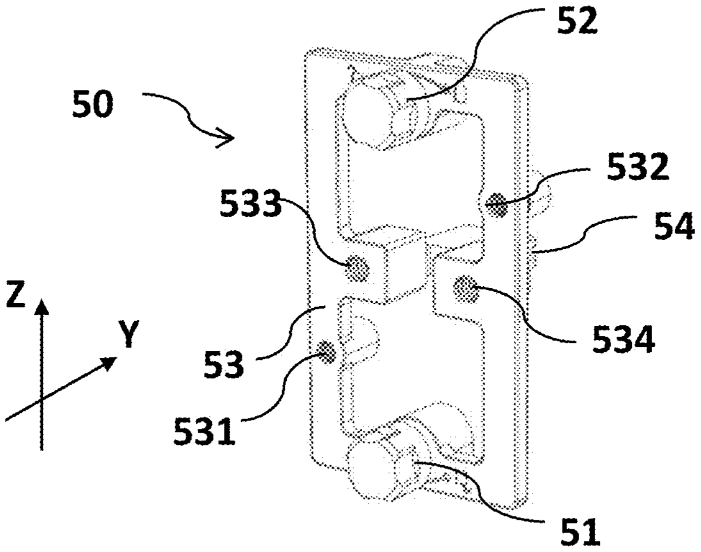
FIGS. 6-7 illustrate the structure of a mechanical connector according to some embodiments of the present invention.
Figure 7:
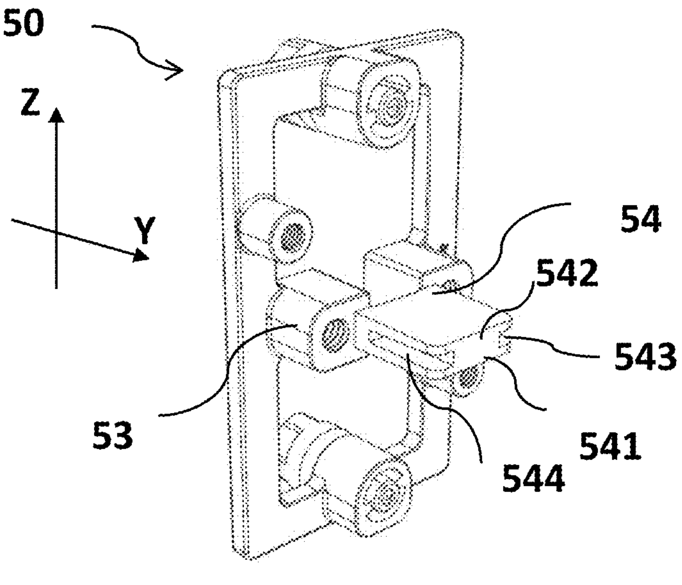

Referring to FIGS. 6-7, the mechanical connector 50 may include jackscrews 51 and 52, a frame 53 and an interconnect protrusion 54. The jackscrews 51 and 52 are respectively located at two ends of the frame 53 along an axis Z, and the interconnect protrusion 54 protrudes laterally from a central part of the frame 53 along an axis Y orthogonal to the axis Z. The interconnect protrusion 54 has a block portion 541 and a block portion 542 opposite to the block portion 541 along the axis Z. The interconnect protrusion 54 also has a groove 543 defined on a first side and a groove 544 defined on a second side opposite to the first side, both extending through the interconnect protrusion 54 along the axis Y and between block portions 541 and 542. Accordingly, when the solid-state lighting units 1 and 2 are mechanically connected by the mechanical connector 50, the block portions 541, 542 of the interconnect protrusion 54 are inserted into the slots 1121 (see FIG. 1B) of the accessory shoes 112 of the adjacent lighting units 1 and 2, respectively, and locked by the spring tensioners 1122 (see FIG. 1B) of the accessory shoes 112 of the lighting units 1 and 2, respectively. The jackscrews 51 and 52 can then be used to apply loading to the back of the lighting units 1 and 2 respectively (see FIG. 5B), so that the lighting units 1 and 2 are aligned with each other along the axis Y. The frame 53 may also include threaded holes 531, 532, 533 and 534 for fixing other accessories.

FIGS. 8-17 show lighting units attached with different optical components to provide various specifications and functions according to some embodiments of the present invention.

Figure 8:
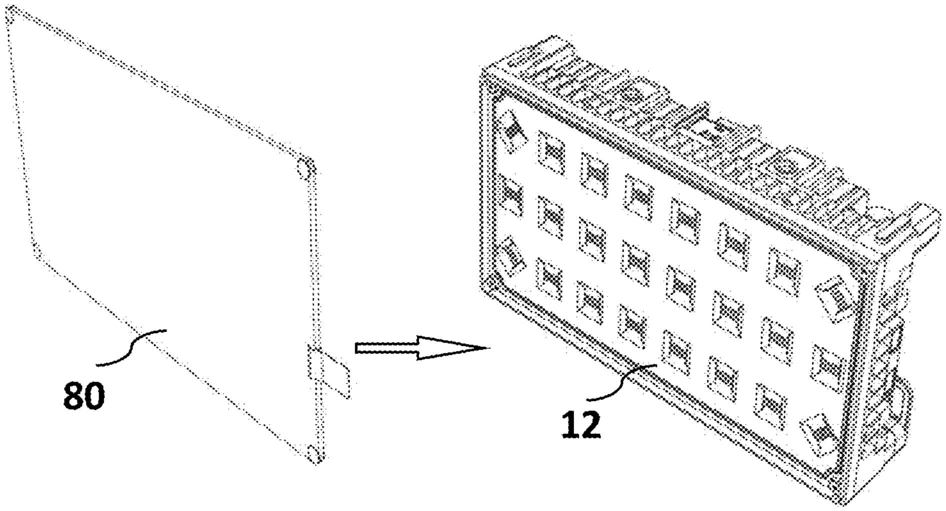
FIGS. 8-17 show how different optical components are attached to the front cover to form lighting units with different specifications and functions according to some embodiments of the present invention.
Figure 9:
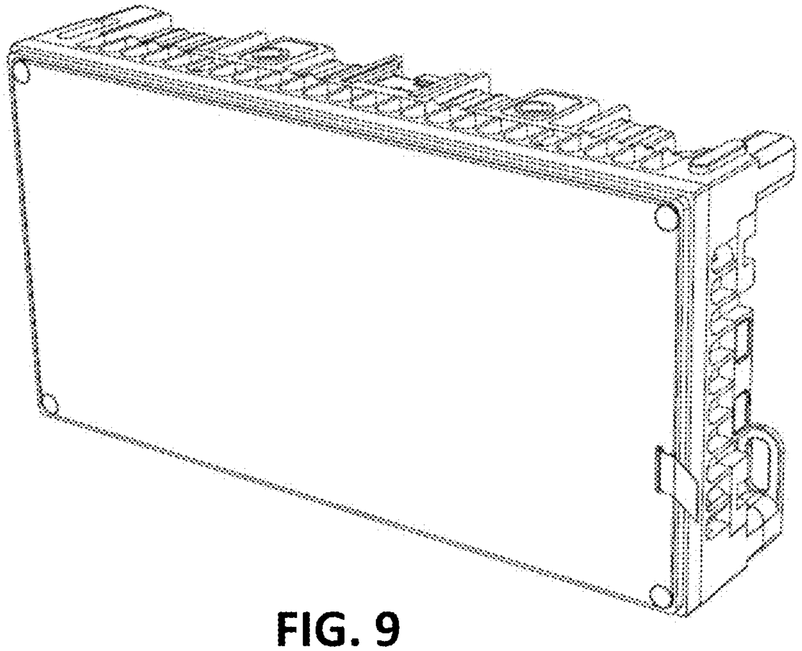

Referring to FIGS. 8 and 9, the solid-state lighting unit 1 may include a gel holder 80. The gel holder 80 is removably attached to the front cover 12 for accommodating one or more color filters.

Figure 10:
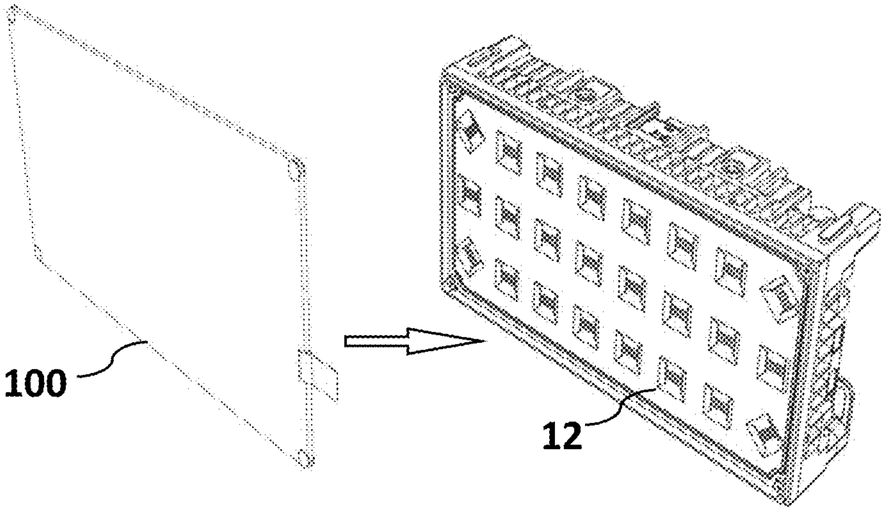
Figure 11:
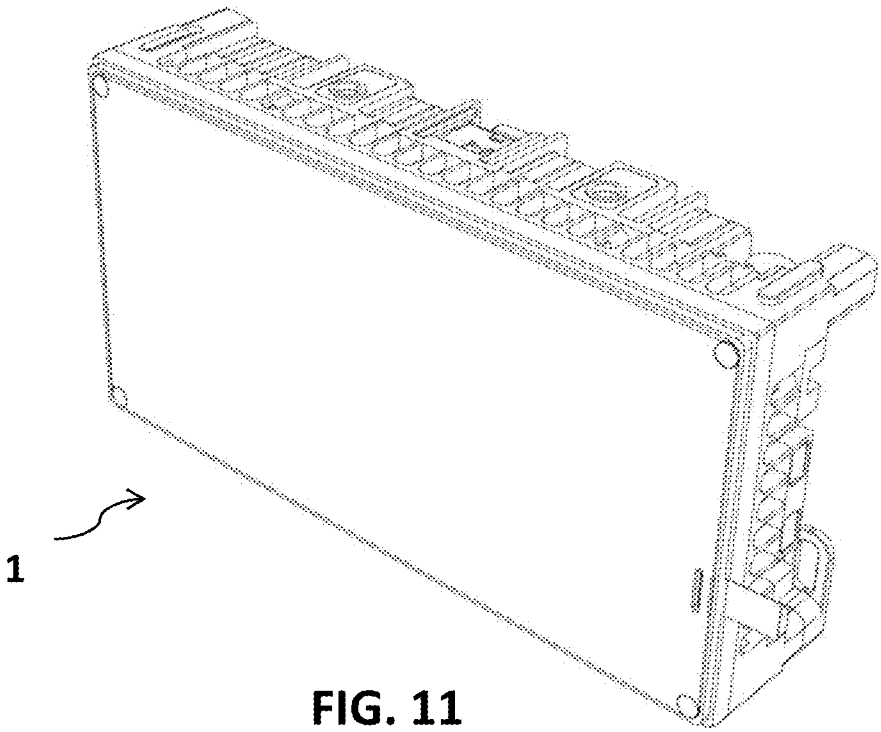

Referring to FIGS. 10 and 11, the solid-state lighting unit 1 may include a diffuser 100. The diffusion 100 is removably attached to the front cover 12 and configured to diffuse light output from the plurality of solid-state light sources.

Figure 12:
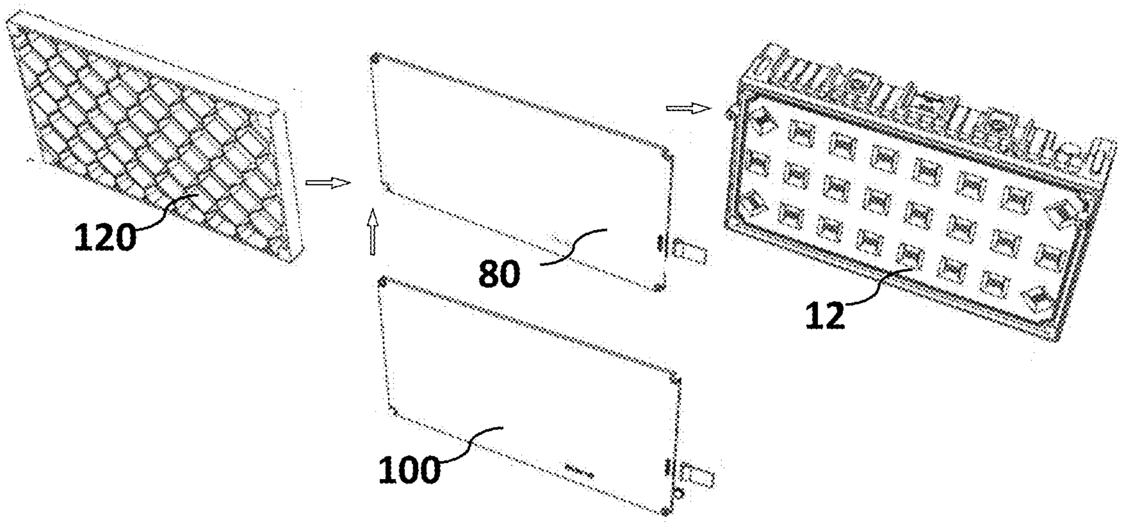
Figure 13:
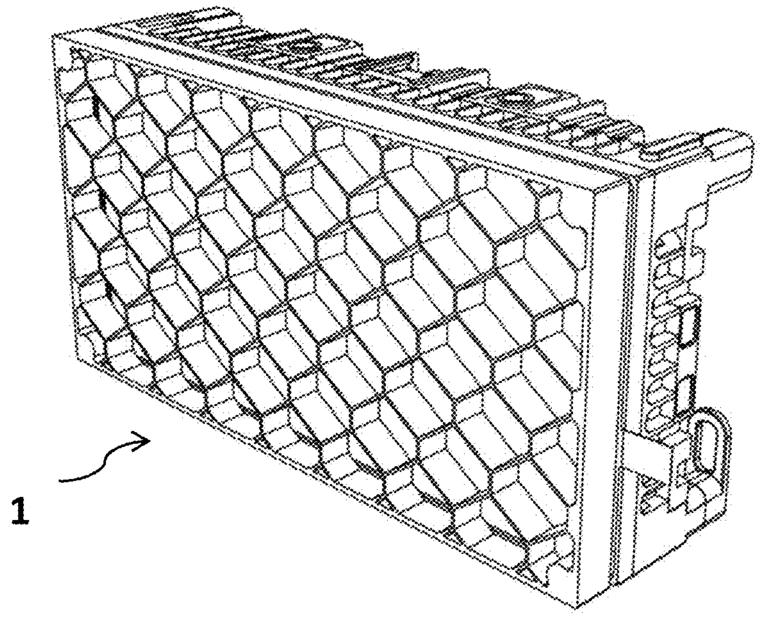

Referring to FIGS. 12-13, the solid-state lighting unit 1 may include a gel holder 80, a diffuser 100 and an egg-crate-grille adjuster 120. The gel holder 80 is removably attached to the front cover 12 for accommodating one or more color filters. The diffuser 100 is removably attached to the gel holder 80 and configured to diffuse light output from the plurality of solid-state light sources. The egg-crate-grille adjuster 120 is removably attached to the diffuser 100 for blocking off-axis light scattered by the diffuser 100. The egg-crate-grille adjuster 120 can have various grid sizes to suit different requirements.

Figure 14:
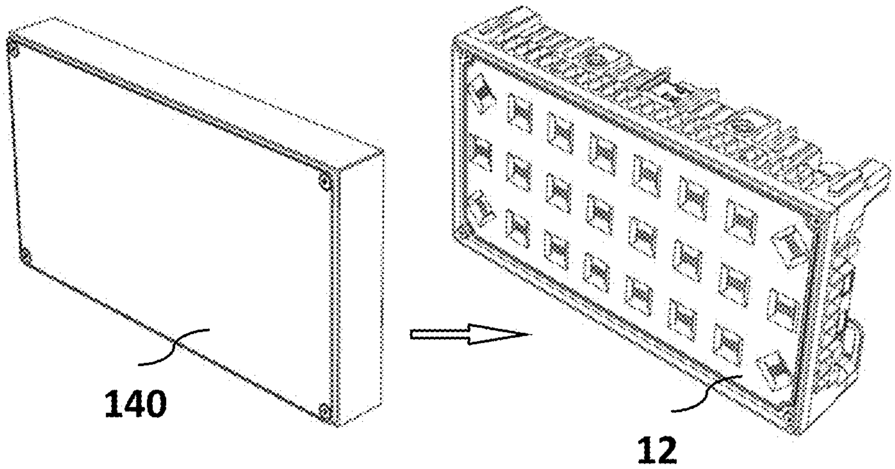
Figure 15:
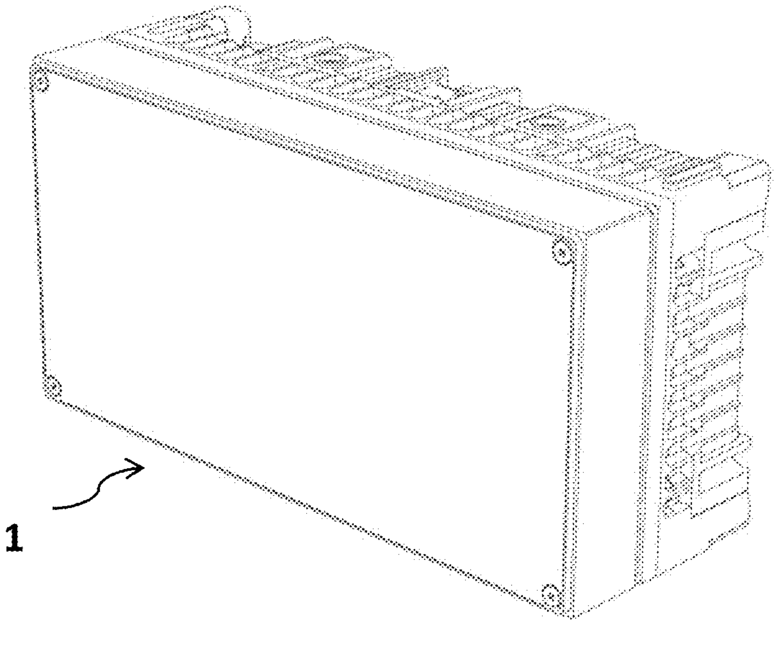

Referring to FIGS. 14-15, the solid-state lighting unit 1 may include an intensifier 140. The intensifier 140 is removably attached to the front cover 12 for intensifying the light output from the plurality of solid-state light sources. The intensifier 140 can have different thicknesses to suit different requirements.

Figure 16:
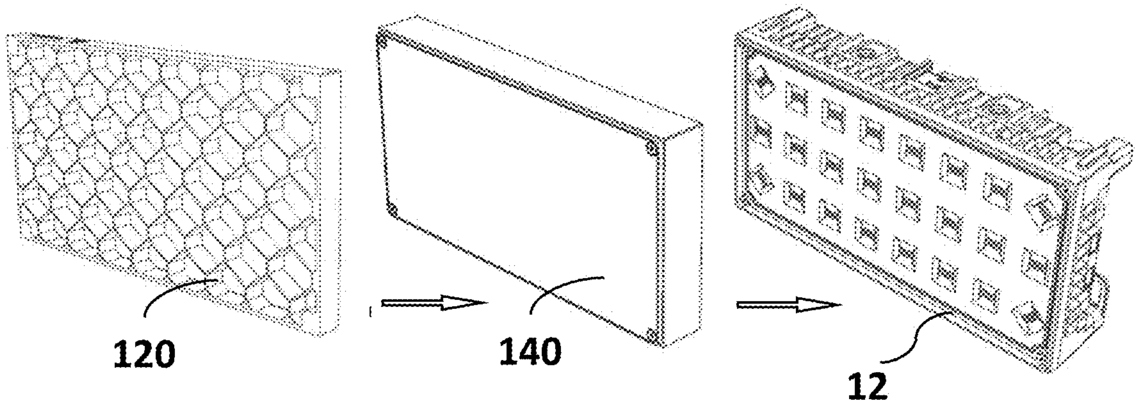
Figure 17:
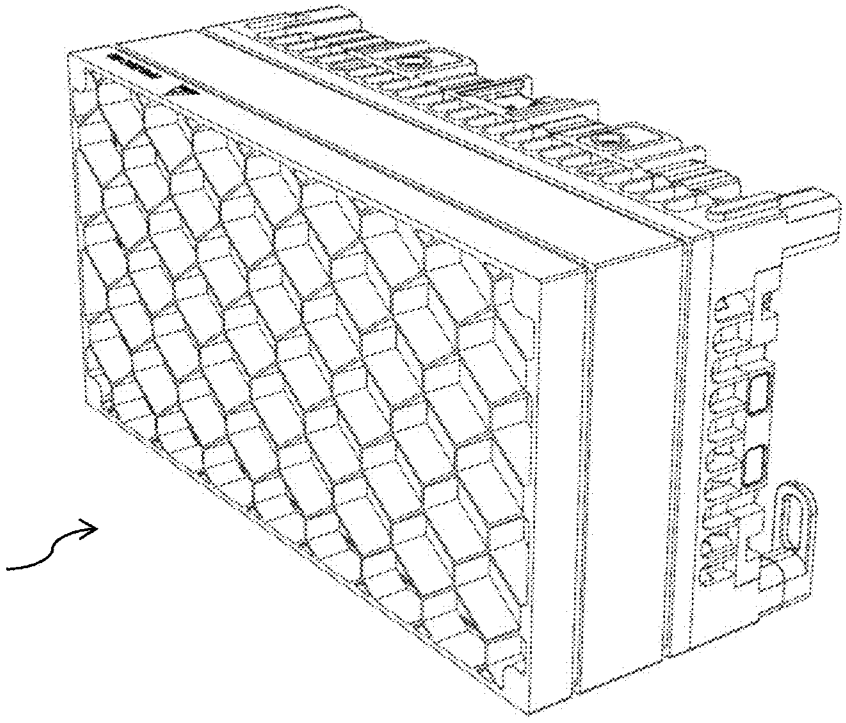

Referring to FIGS. 16-17, the solid-state lighting unit 1 may include an intensifier 140 and an egg-crate-grille adjuster 120. The intensifier 140 is removably attached to the front cover 12 for intensifying the light output from the plurality of solid-state light sources. The egg-crate-grille adjuster 120 is removably attached to intensifier 140 for blocking off-axis light. The egg-crate-grille adjuster 120 can have various grid sizes to suit different requirements.

Figure 18:
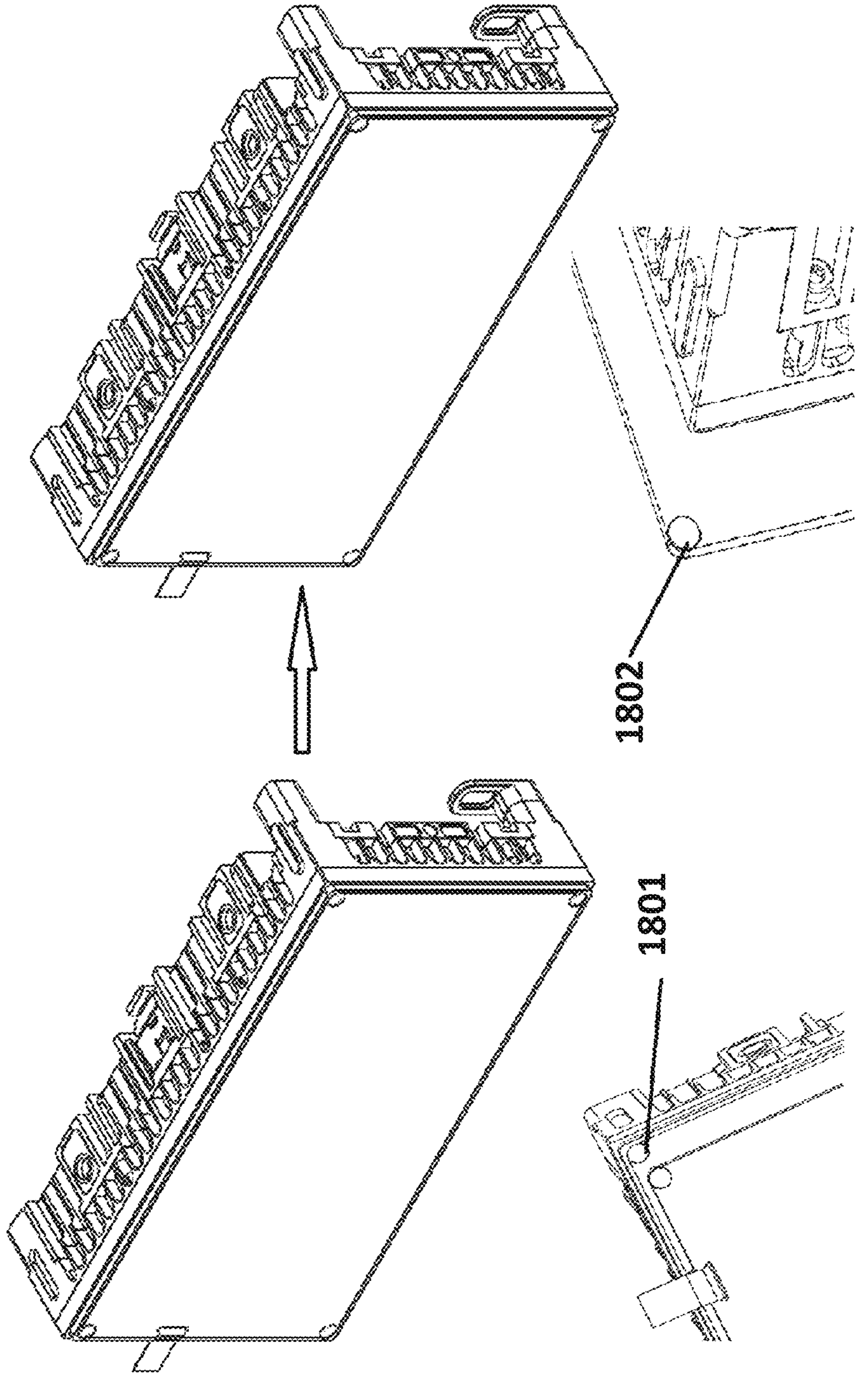
FIGS. 18-19 show schematic diagrams of how to attach or detach different optical components on the front cover through the coupling of magnets and iron chips according to some embodiments of the present invention.
Figure 19:
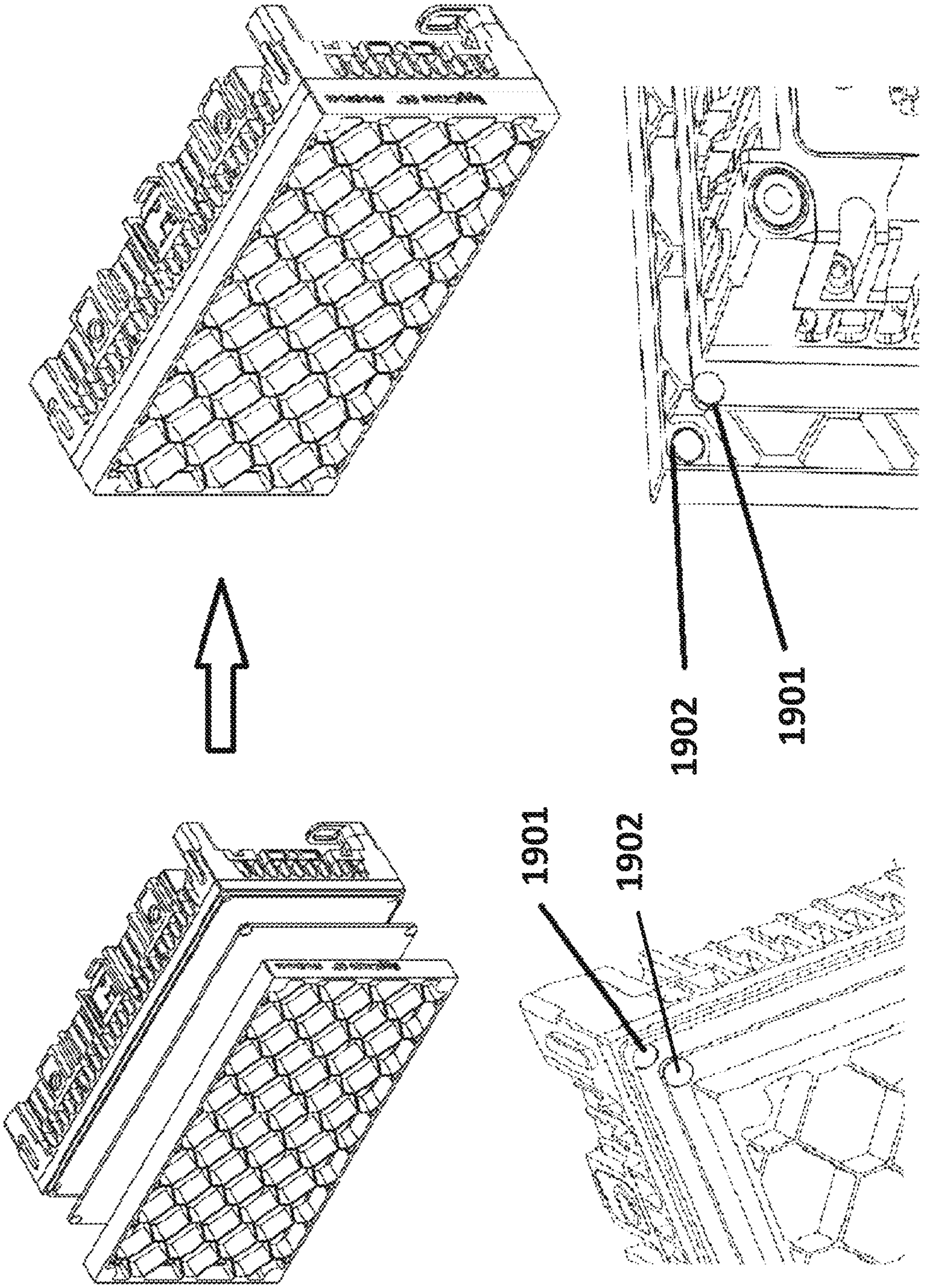

Referring to FIGS. 18-19, the front cover 12 can attach or detach different optical parts or light modifying accessories (such as gel holders, diffusers, egg-crate-grille adjustors, intensifiers) through the coupling of magnets and iron chips to form lighting units with different specifications and functions. As shown in FIG. 18, the front cover 12 may include magnets 1801 at four corners, and the gel holder may include iron chips 1802 at four corners. The shapes of the magnet match the shape of the iron chips, and the positions of the magnets match the positions of the iron chips. In this way, the gel holder can be attached to the front cover 12 or detached from the front cover 12 conveniently. As shown in FIG. 19, the diffuser may include magnets 1901 at four corners, and the egg-crate grille adjuster may include iron chips 1902 at four corners corresponding to the magnets 1901. In this way, the egg-crate-grille adjuster can be easily attached to or detached from the diffuser.

Figure 20A:
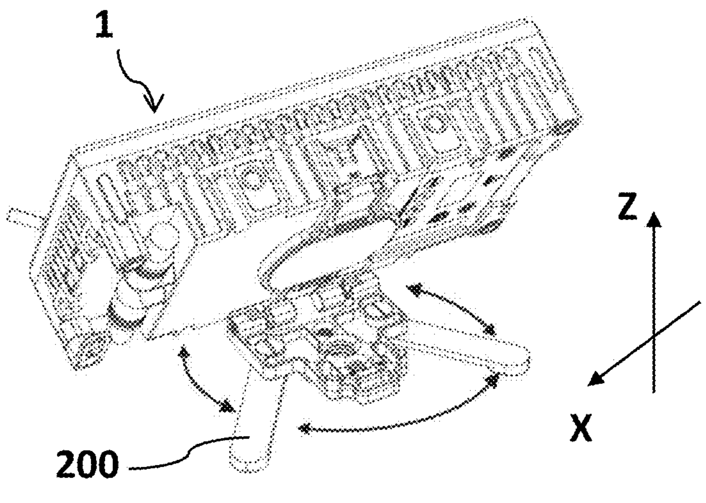
FIGS. 20A-20C illustrate a solid-state lighting unit installed with a removable supporting member according to some embodiments of the present invention.
Figure 20B:
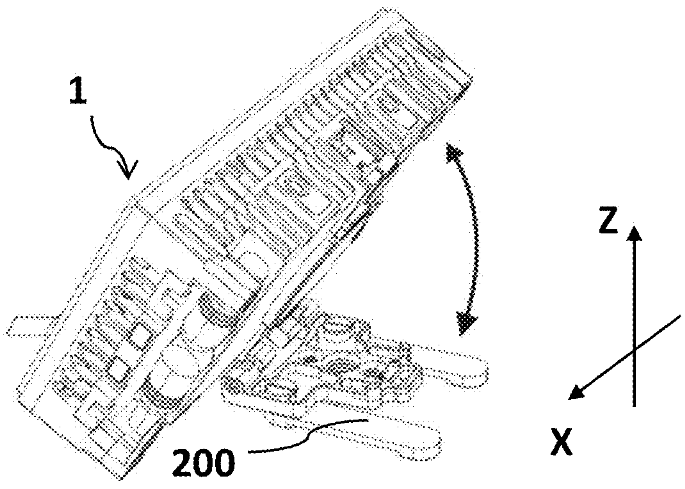
Figure 20C:
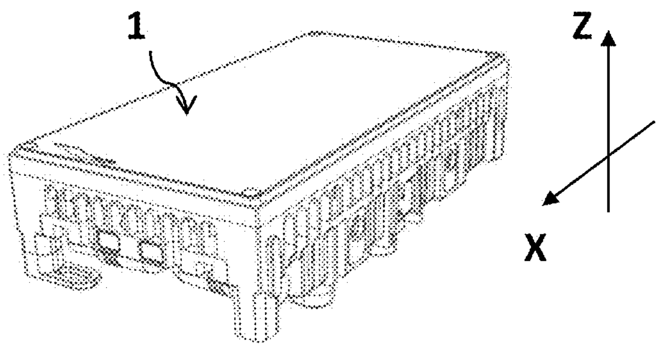

Referring to FIGS. 20A-20C, the solid-state lighting unit 1 may further include a removable supporting member 200 fixed on the housing 11. The supporting member 200 can allow the solid-state lighting unit 1 to rotate along the horizontal axis X or the vertical axis Z to adjust the direction of illumination.

Figure 21A:
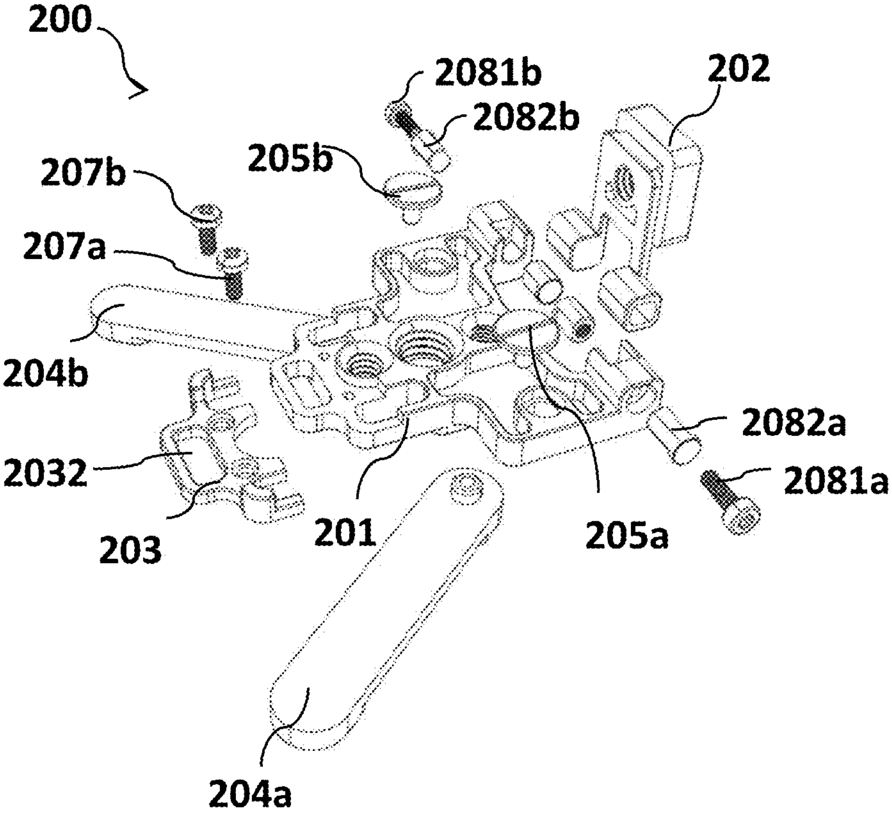
FIGS. 21A-21B show structural views of a removable support.
Figure 21B:
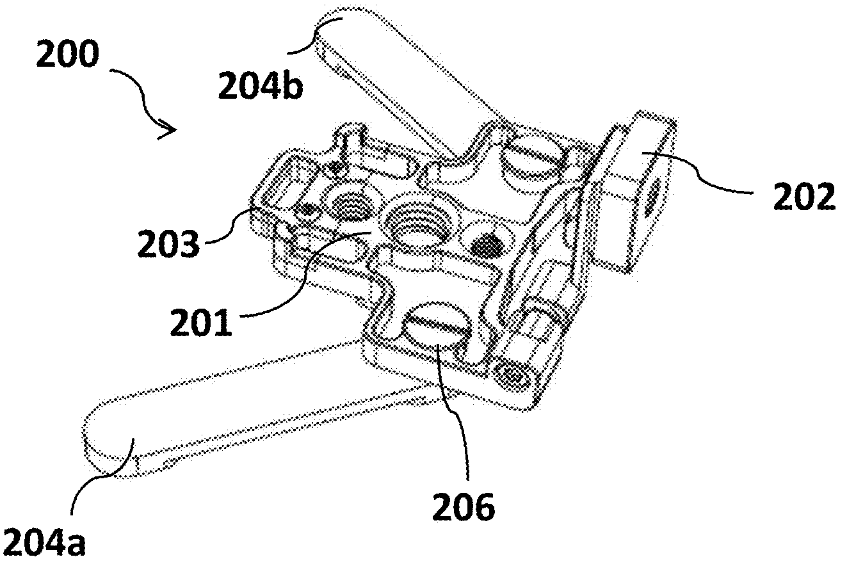

Referring to FIGS. 21A and 21B, the supporting member 200 may include: a main body 201 for being attached with one or more mounting accessories, a connector 202, a fixing element 203. The one or more mounting accessories may include first and second brackets 204*a*, 204*b*. The connector 202 is hinged to the main body 201 by screws 2081*a* and 2081*b*, bearings 2082*a* and 2082*b*, and is used to connect the supporting member 200 to the housing and allow the solid-state lighting unit to rotate along the horizontal axis X through the supporting member 200 to adjust the direction of illumination. The fixing element 203 is fixed on the main body 201 by screws 207*a* and 207*b*. The fixing element 203 has an opening 2032 to allow the solid-state lighting unit to be fixed using wire or cable ties. The first bracket 204*a* and the second bracket 204*b* are rotatably fixed on the main body 201 by screws 205*a* and 205*b* respectively, for allowing the solid-state lighting unit 1 to stand on a platform and rotate along the vertical axis Z through the supporting member 200.

Figure 22A:
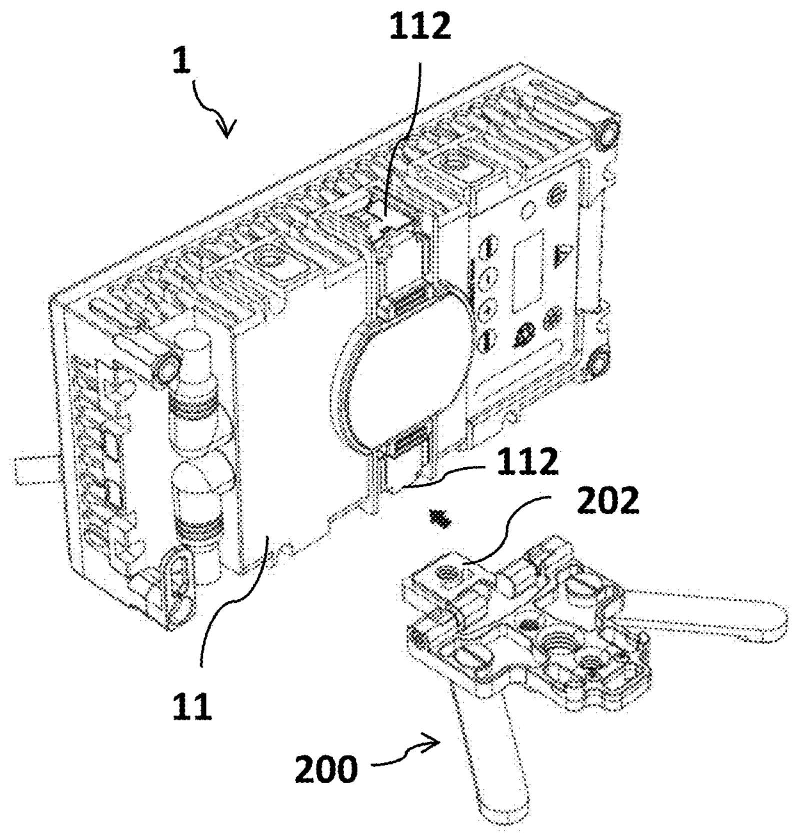
FIGS. 22A-22B show schematic diagrams of how to mount the removable supporting member to a solid-state lighting unit.
Figure 22B:
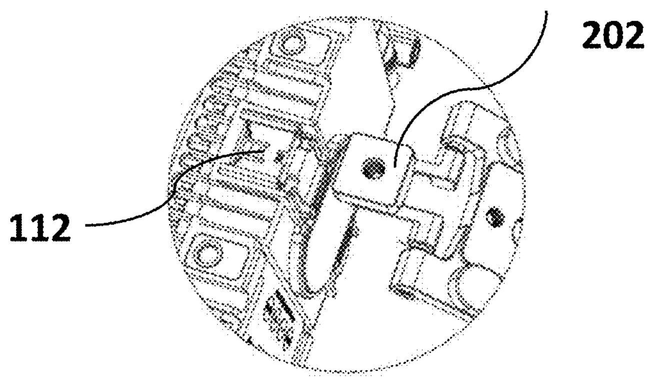

Referring to FIGS. 22A and 22B, the connector 202 is shaped to match the accessory shoe 112 on the side of the housing 11 of the solid-state lighting unit 1. When the supporting member 200 is mounted on the housing 11 of the solid-state lighting unit 1, the connector 202 can be snugly inserted into the accessory shoe 112 on the housing 11.

Figure 23A:
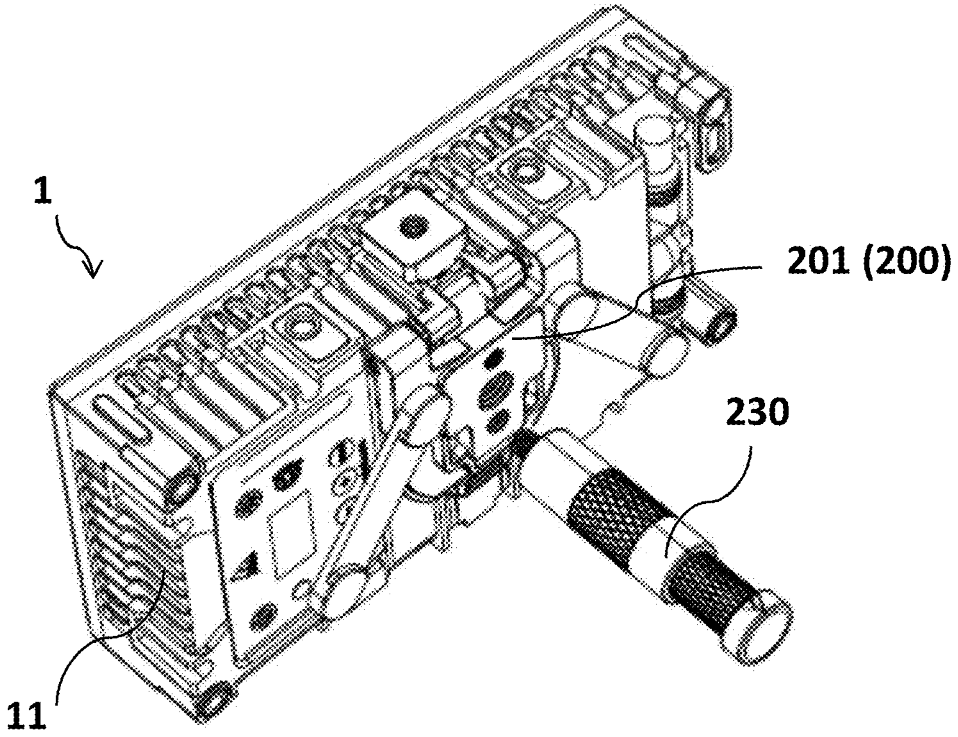
FIGS. 23A-23B illustrate a solid-state lighting unit installed with a pin mount on back side according to some embodiments of the present invention.
Figure 23B:
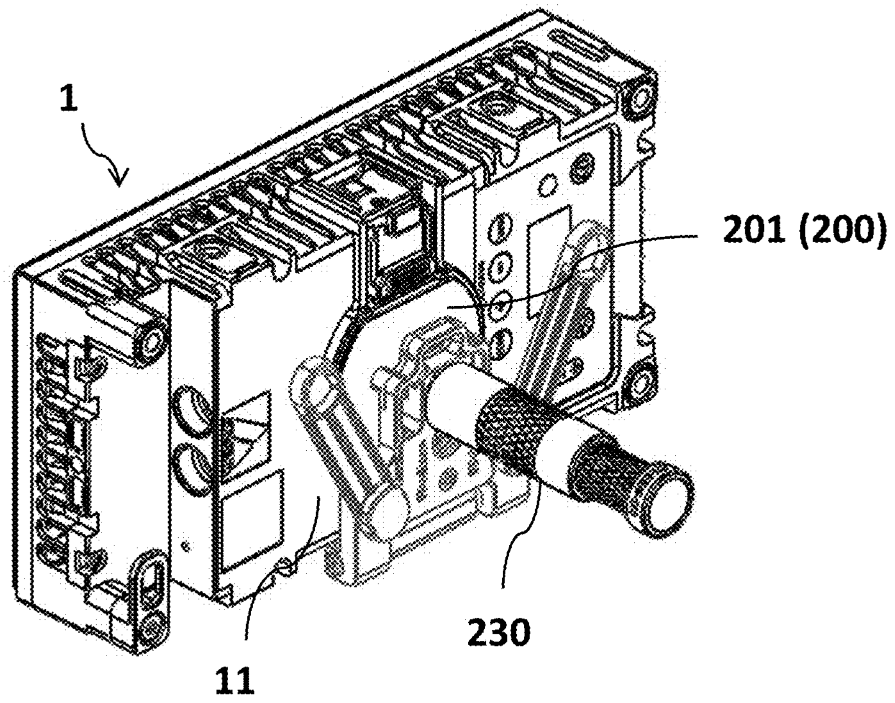
Figure 24A:
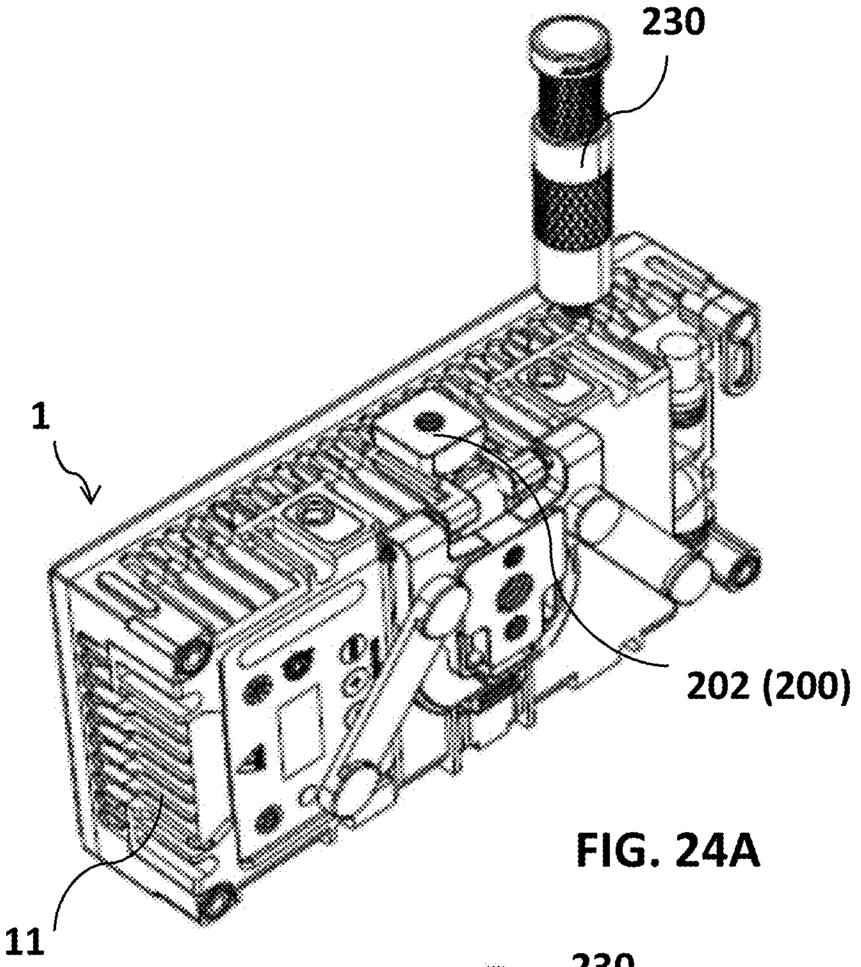
FIGS. 24A-24B illustrate a solid-state lighting unit installed with a pin socket according to other embodiments of the present invention.
Figure 24B:
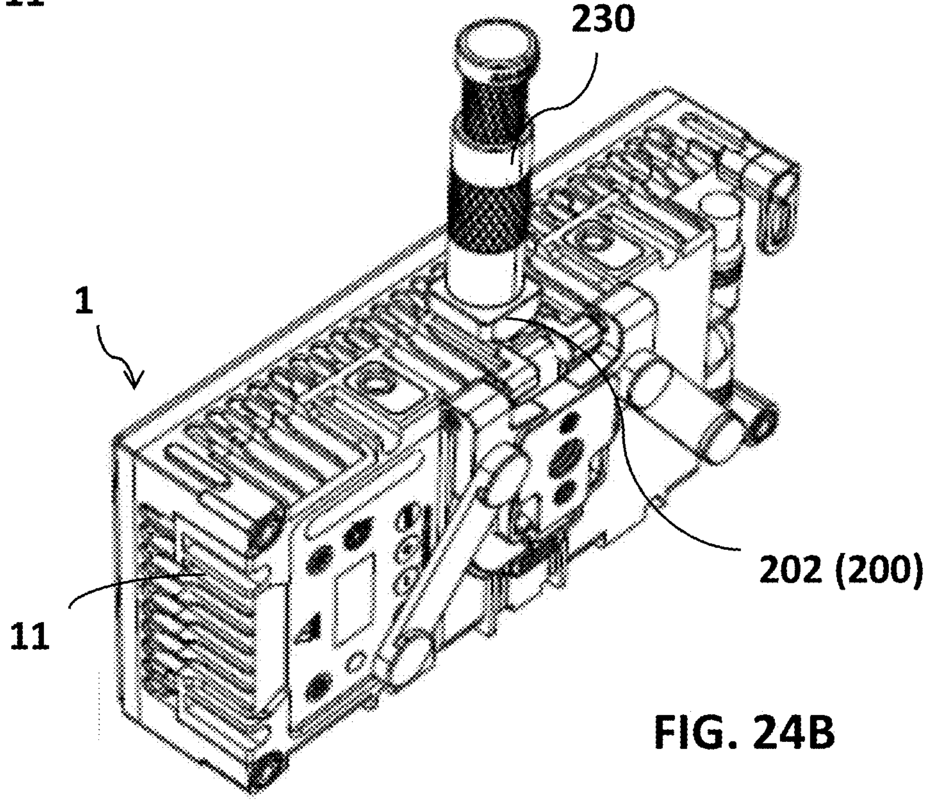

In some embodiments, as shown in FIGS. 23A-24B, the one or more mounting accessories may include a pin socket 230 fixed on the supporting member 200 to allow the solid-state lighting unit 1 to be used with other standard lighting devices. As shown in FIGS. 23A and 23B, a pin socket 230 may be mounted on the main body 201 of the supporting member 200. In other words, the pin socket 230 may be connected to the back of the housing 11 through the supporting member 200. As shown in FIGS. 24A and 24B, the pin socket 230 may be mounted on the connector 202 of the supporting member 200. In other words, the pin socket 230 may be connected to the side of the housing through the supporting member 200.

Figure 25:
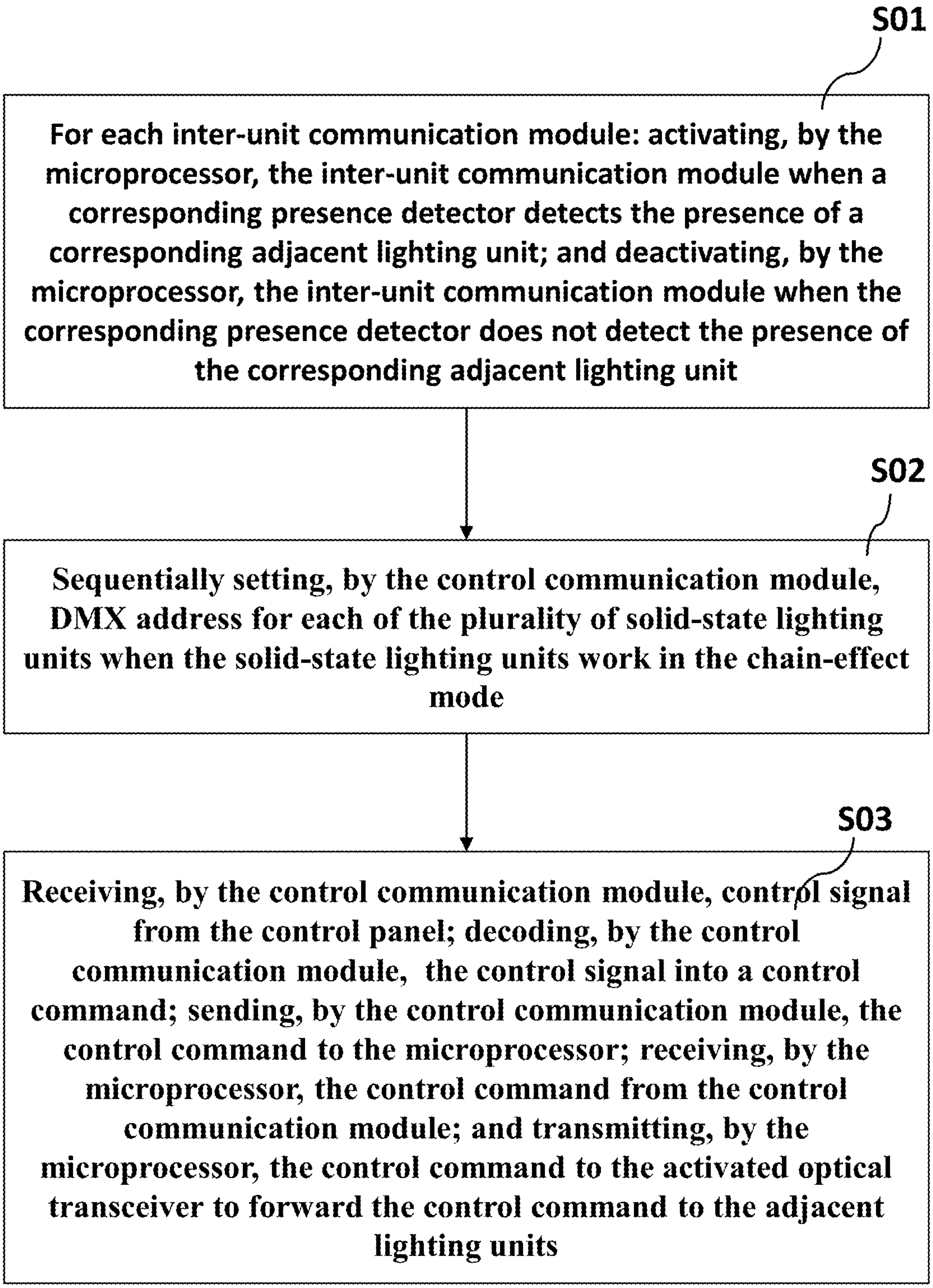
FIG. 25 illustrates a method of operating a solid-state lighting unit in combination with one or more lighting units to form a solid-state lighting apparatus which can work as a virtual single lighting unit in synchronous mode or chain-effect mode.

FIG. 25 illustrates a method of operating a solid-state lighting unit in combination with one or more lighting units to form solid-state lighting apparatus which can work as a virtual single lighting unit operating in synchronous mode or chain-effect mode. The method includes three stages, namely: S01: detection of the presence of adjacent lighting units; S02: setting of DMX addresses of adjacent lighting units; and S03: communication between adjacent lighting units.

Stage S01 (detection of the presence of adjacent lighting units) comprises: for each inter-unit communication module: activating, by the microprocessor, the inter-unit communication module when a corresponding presence detector detects the presence of a corresponding adjacent lighting unit; and deactivating, by the microprocessor, the inter-unit communication module when the corresponding presence detector does not detect the presence of the corresponding adjacent lighting unit.

Stage S02 (setting of DMX addresses of adjacent lighting units) comprises: sequentially setting, by the control communication module, DMX address for each of the plurality of solid-state lighting units when the solid-state lighting units work in the chain-effect mode.

Stage S03 (communication between adjacent lighting units) includes: receiving, by the control communication module, control signal from the control panel; decoding, by the control communication module, the control signal into a control command; sending, by the control communication module, the control command to the microprocessor; receiving, by the microprocessor, the control command from the control communication module; and sending, by the microprocessor, the control command to the activated optical transceiver to forward the control command to the adjacent lighting units.

Figure 26A:
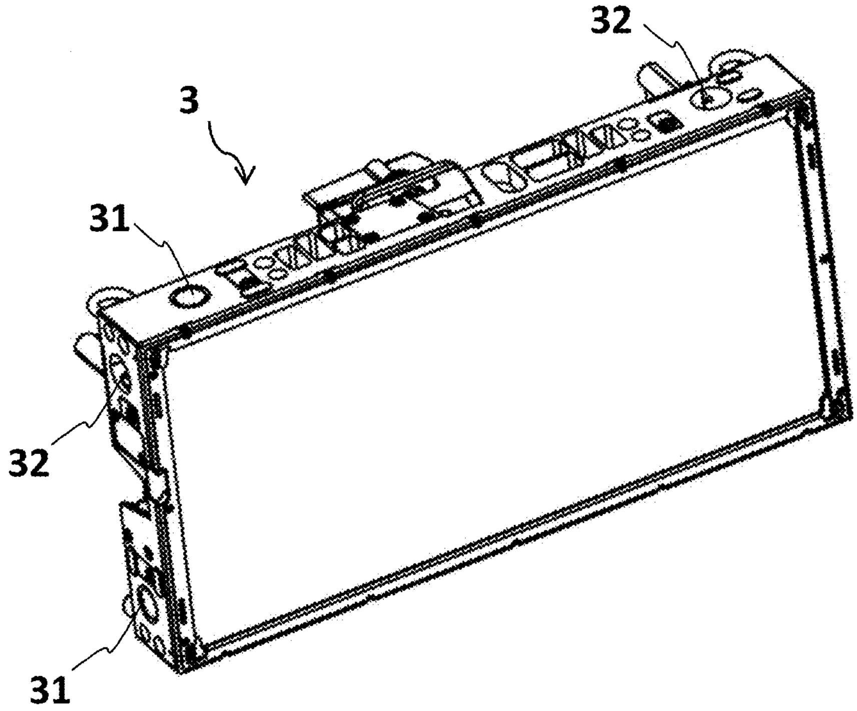
FIGS. 26A and 26B illustrate perspective views of a solid-state lighting unit installed with interlocking assemblies according to some embodiments of the present invention.
Figure 26B:
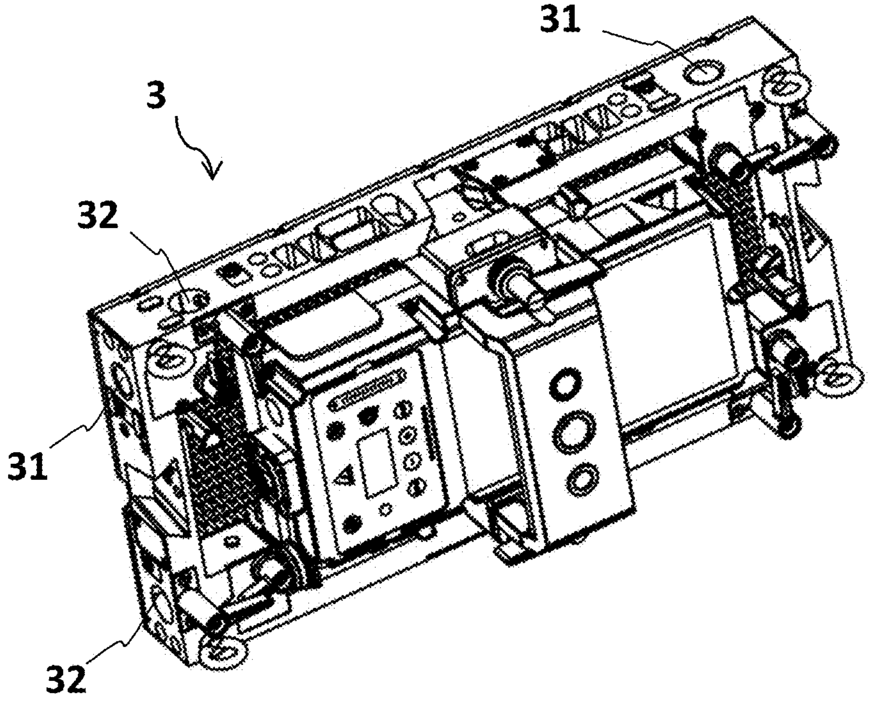
Figure 26C:
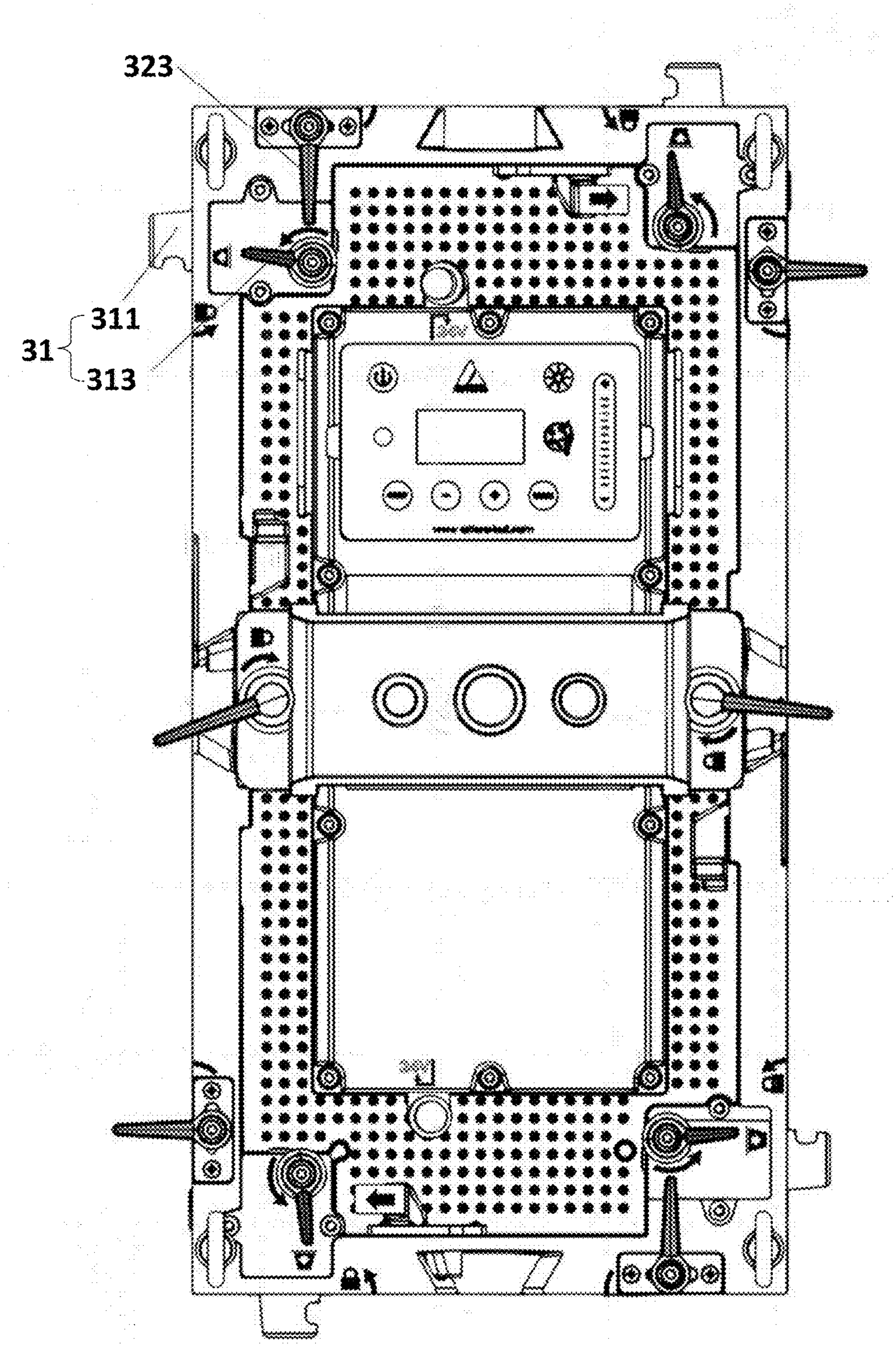
FIG. 26C illustrates a rear view of the lighting unit.
Figure 26D:
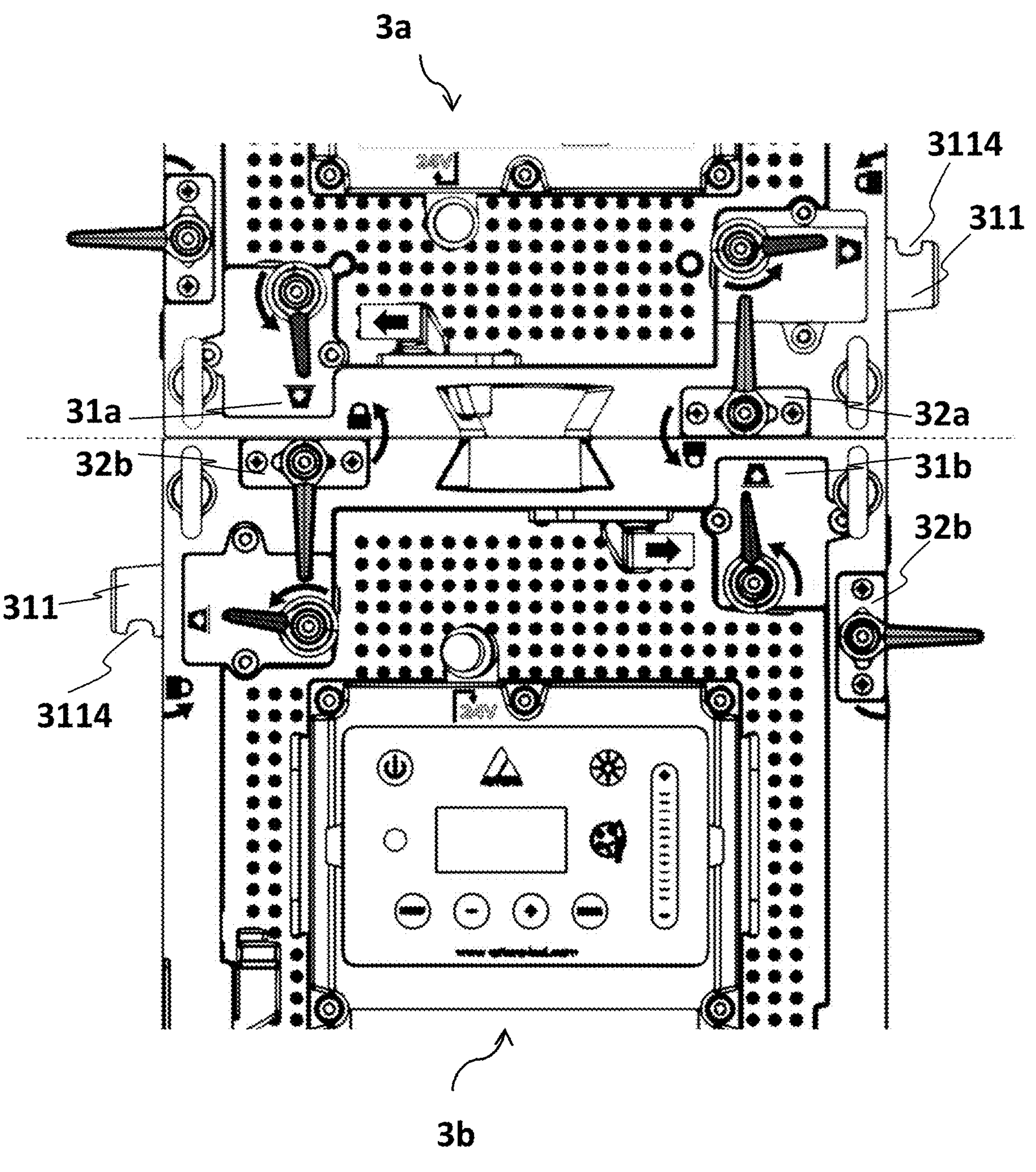
FIG. 26D shows partial views of two solid-state lighting units connected to each other.

FIGS. 26A and 26B illustrate perspective views of a solid-state lighting unit 3 installed with interlocking assemblies according to some embodiments of the present invention. FIG. 26C illustrates a rear view of the lighting unit. As shown, the solid-state lighting unit 3 may comprise one or more pairs of interlocking assemblies on each side of the solid-state lighting unit 3. Each pair including a male interlock assembly 31 and a female interlock assembly 32. FIG. 26D shows partial views of two solid-state lighting units 3*a* and 3*b* connected to each other, end to end, through their interlock assemblies, it is also possible to interconnect the lighting units side by side. As shown, a male interlock assembly 31 of the lighting unit 3*a* is configured to engage with a female interlock assembly 32 of the lighting unit 3*b*; and a female interlock assembly 32 of the lighting unit 3*a* is configured to engage with a male interlock assembly 31 of the lighting unit 3*b*.

Figure 27A:
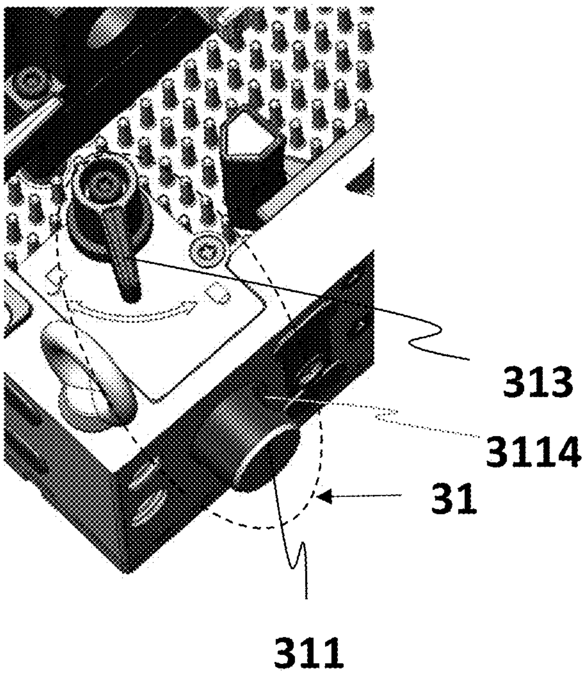
FIGS. 27A and 27B show closeup views of the male interlock assembly at different positions.
Figure 27B:
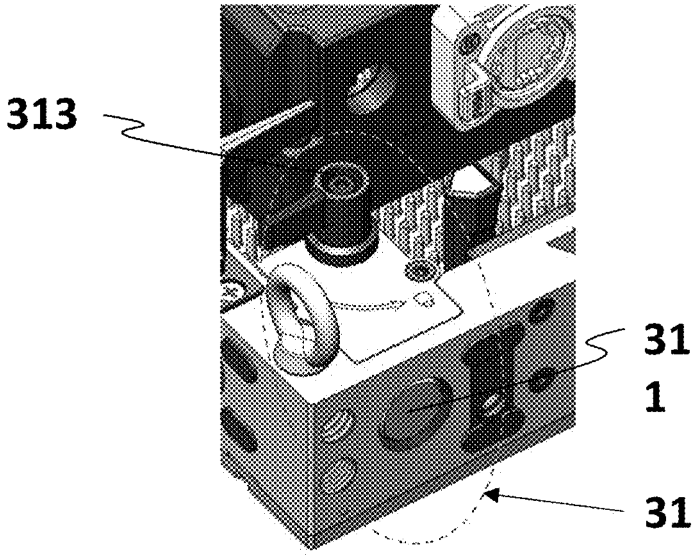
Figure 28A:
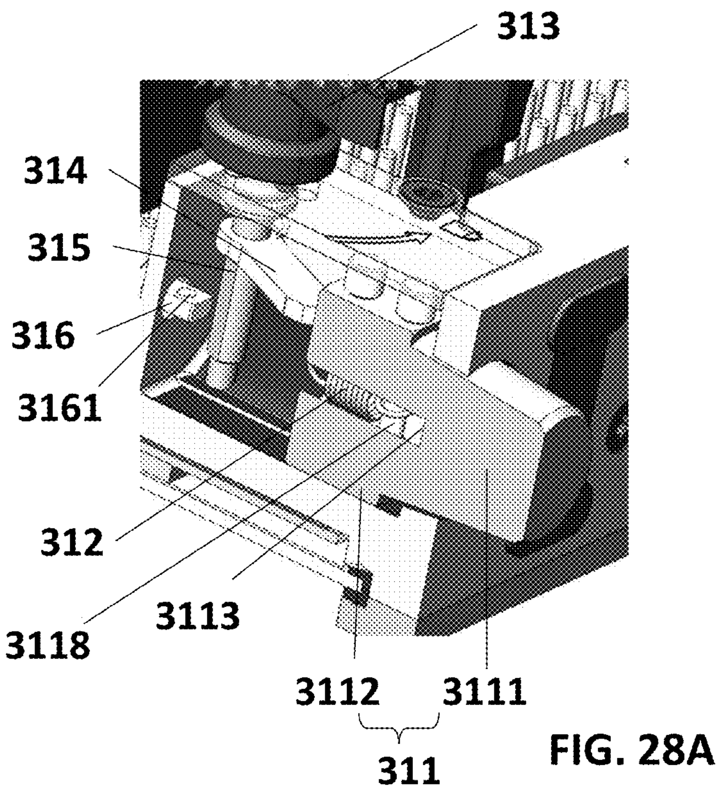
FIGS. 28A and 28B show partial cross-sectional views of the male interlock assembly at different positions.
Figure 28B:
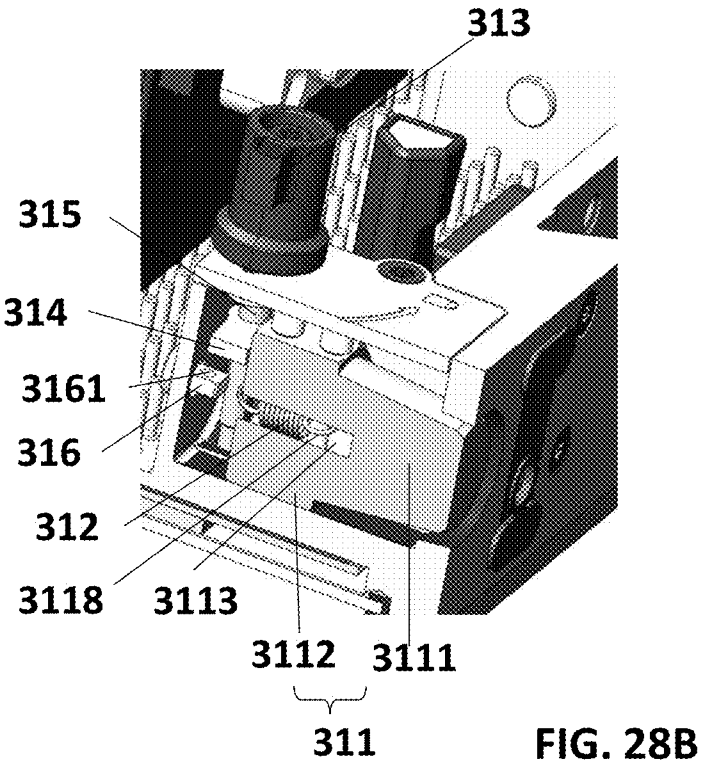

FIGS. 27A and 27B show closeup views of the male interlock assembly 31 at different positions. FIGS. 28A and 28B show partial cross-sectional views of the male interlock assembly 31 at different positions. As shown, each male interlock assembly 31 comprises a movable latch 311, a retraction spring 312, a rotatable lever 313, a cam 314, and a connection shaft 315 connecting the rotatable lever 313 to the cam 314. The movable latch 311 may be configurable to be in a protruding position (as shown in FIGS. 27A and 28A) or a retracting position (as shown in FIGS. 27B and 28B).

The movable latch 311 has a front part 3111 and a rear part 3112. The retraction spring 312 is disposed in a cavity 3113 opened in the rear part 3112. The movable latch 311 may have a notch 3114 cut into one side of the protruding section of the movable latch 311. As described in more details later, the notch 3114 locks with a notched locking shaft 322 in a female interlock assembly of another lighting unit to secure the interlocking. The retraction spring 312 has a first end fixed in the housing and a second end fixed in the rear part 3112 of the movable latch 311. The retraction spring 312 is configured for pulling the movable latch 311 from the protruding position to the retracting position.

In one embodiment, each of the first and second ends of the retraction spring 312 is formed as a hook shape. Each male interlock assembly 31 further comprises a tab 316 having a receiving hole 3161 for receiving and holding first hook-shaped end of the retraction spring 312. Each male interlock assembly 31 further comprises a receiving pin 3118 passing through the cavity 3113 in the rear part 3112 and configured for receiving and holding the second hook-shaped end of the retraction spring 312.

When the cam 314 is at a first position (as shown in FIG. 28A), the movable latch 311 is pushed by the cam 314 to a protruding position through the connection shaft 315, the rotatable lever 313 may be used to rotate the cam 314 from the first position to a second position (as shown in FIG. 28B) through the connection shaft 315 and the movable latch 311 is pulled by a preload force of the retraction spring 312 from the protruding position to the retracting position. When the movable latch 311 is in the retracting position, the rotatable lever 313 may then be used to rotate the cam 314 from the second position to the first position through the connection shaft 315 such that the movable latch 311 is pushed from the retracting position to the protruding position.

Figure 29:
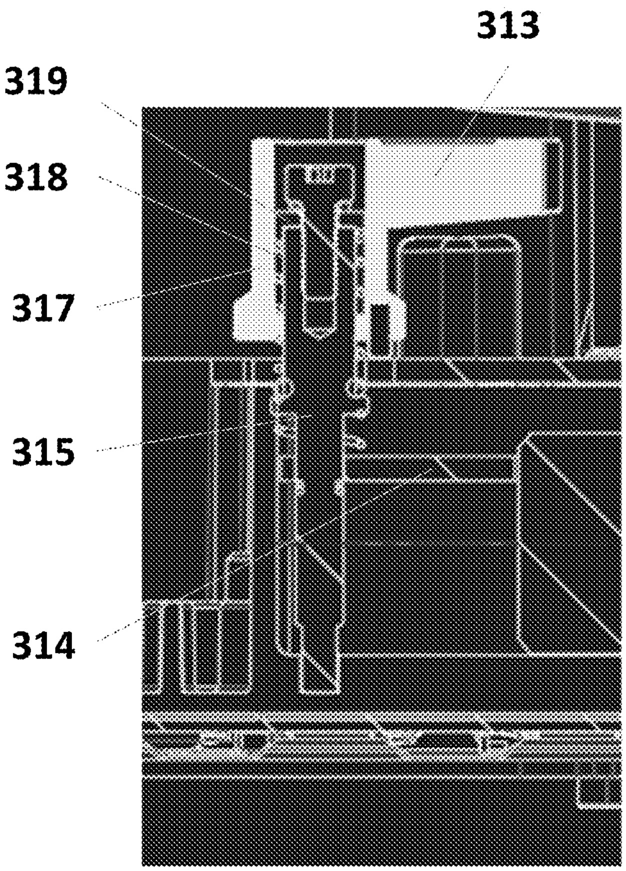
FIG. 29 shows a partial cross-sectional view of the male interlock assembly illustrating more structural details underneath the rotatable lever.

FIG. 29 shows a partial cross-sectional view of the male interlock assembly 31 illustrating more structural details underneath the rotatable lever 313. As shown, the male interlock assembly 31 further includes a tube 317, a securing spring 318 contained in the tube 317 and configured to surround an upper end of the connection shaft 315. In other words, the securing spring 318 is disposed between the tube 317 and the upper end of the connection shaft 315. In some embodiments, the securing spring 318 may be contained in the tube 317 by a stopper 319 fixed (e.g. with a screw) to the connection shaft 315. In some embodiments, the rotatable lever 313 and tube 317 may be formed as an integral part.

The male interlock assembly 31 may have two locking pins (not shown). When the rotatable lever 313 is in the first position (i.e., the latch 311 is at the protruding position to interlock with a female interlock assembly 32 of another lighting unit), the two locking pins are inserted into a first pair of locking holes (not shown) on the housing. When the lever 313 is lifted up slightly to rotate to the second position (to release the interlocking), the locking pins are moved out of the first locking holes and inserted into a second pair of locking holes on the housing when the rotatable lever 313 is in the second position. The securing spring 318 is configured to provide a preload force to secure the two locking pins in the first pair of locking holes or the second pair of locking holes.

Figure 30A:
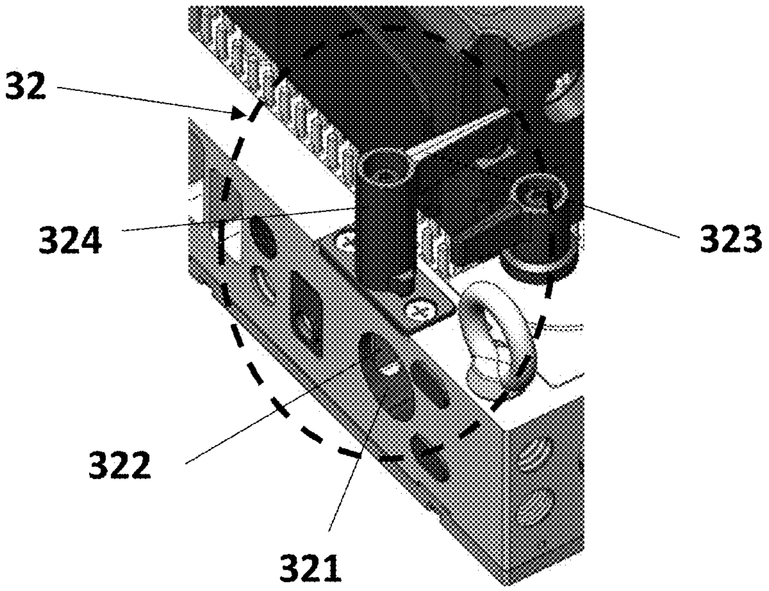
FIGS. 30A and 30B show a closeup view and a cross-sectional view of the female interlock assembly respectively.
Figure 30B:
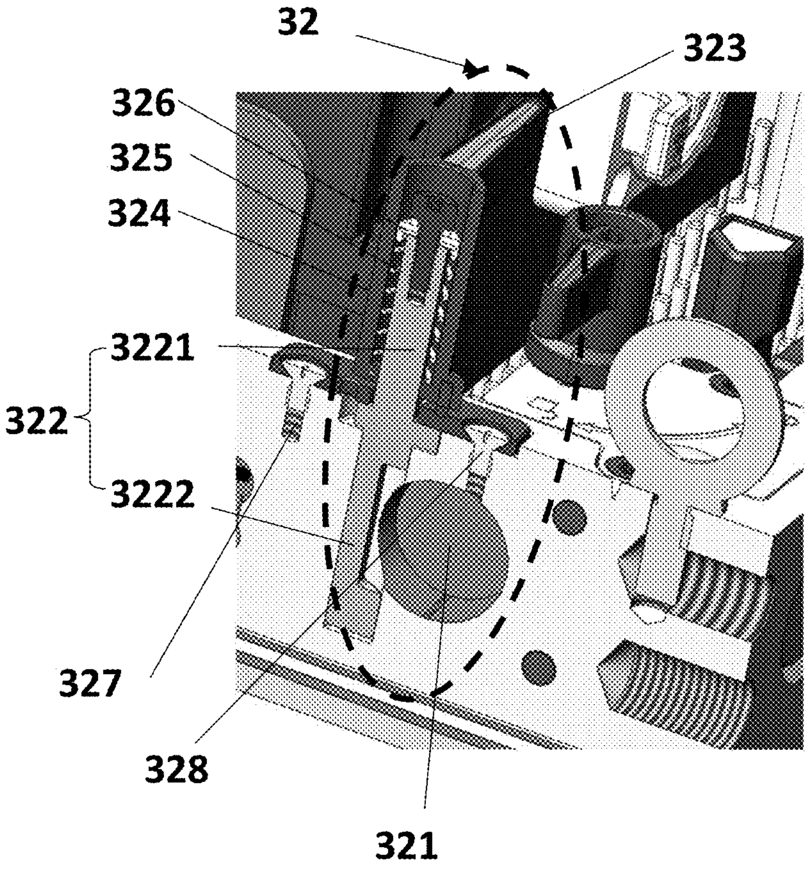

FIGS. 30A and 30B show a closeup view and a cross-sectional view of the female interlock assembly 32 respectively. As shown, the female interlock assembly 32 may comprise a receiving hole 321 for receiving a movable latch (not shown) protruding out from a male interlock assembly of another lighting unit. The female interlock assembly 32 may further comprise a locking shaft 322. The locking shaft 322 may have a circular upper part 3221 and a semicircular notched lower part 3222.

The female interlock assembly 32 may further comprise a rotatable lever 323 and a tube 324. The tube 324 is connected to the rotatable lever 323 and installed around the circular upper part 3221. In some embodiments, the rotatable lever 323 and tube 324 may be formed as an integral part. The rotatable lever 323 may be fixed to the housing with two screws 327 and 328.

The female interlock assembly 32 further includes a securing spring 325 contained in the tube 324 and configured to surround the circular upper part 3221 of the locking shaft 322. In other words, the securing spring 325 is disposed between the tube 324 and the circular upper part 3221 of the locking shaft 322. In some embodiments, the securing spring 325 may be contained in the tube 324 by a stopper 326 fixed (e.g. with a screw) to the circular upper part 3221 of the locking shaft 322.

Figure 31A:
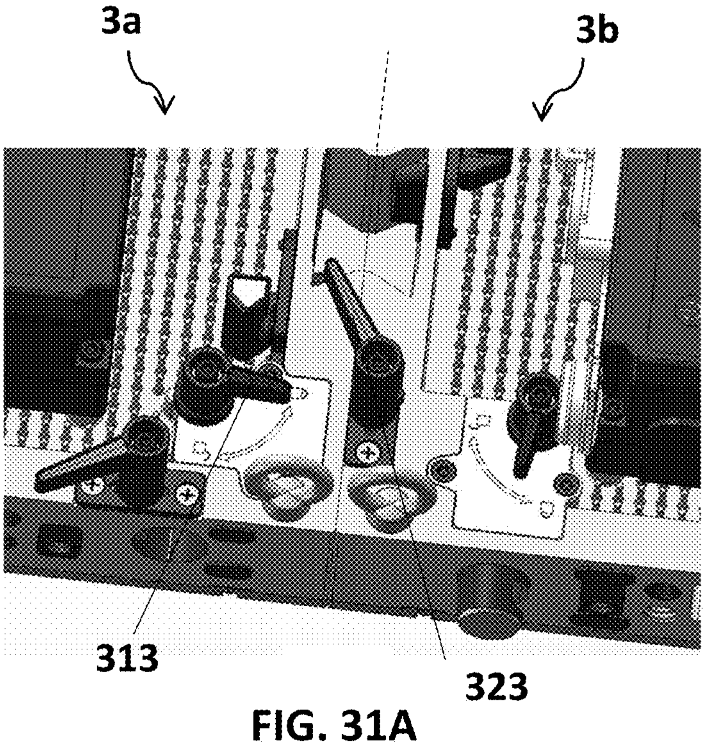
FIGS. 31A to 31D show how two solid-state lighting units are interlocked with each other.
Figure 31B:
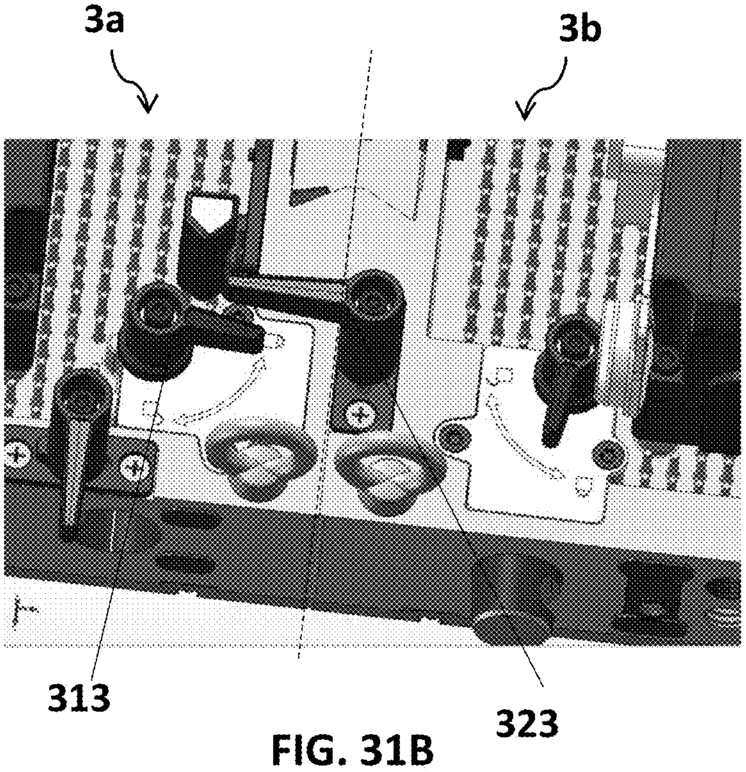
Figure 31C:
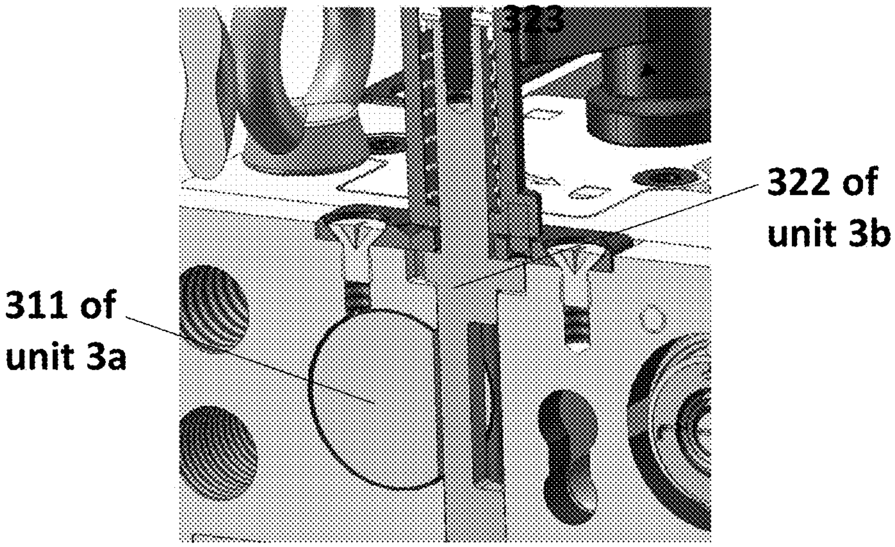
Figure 31D:
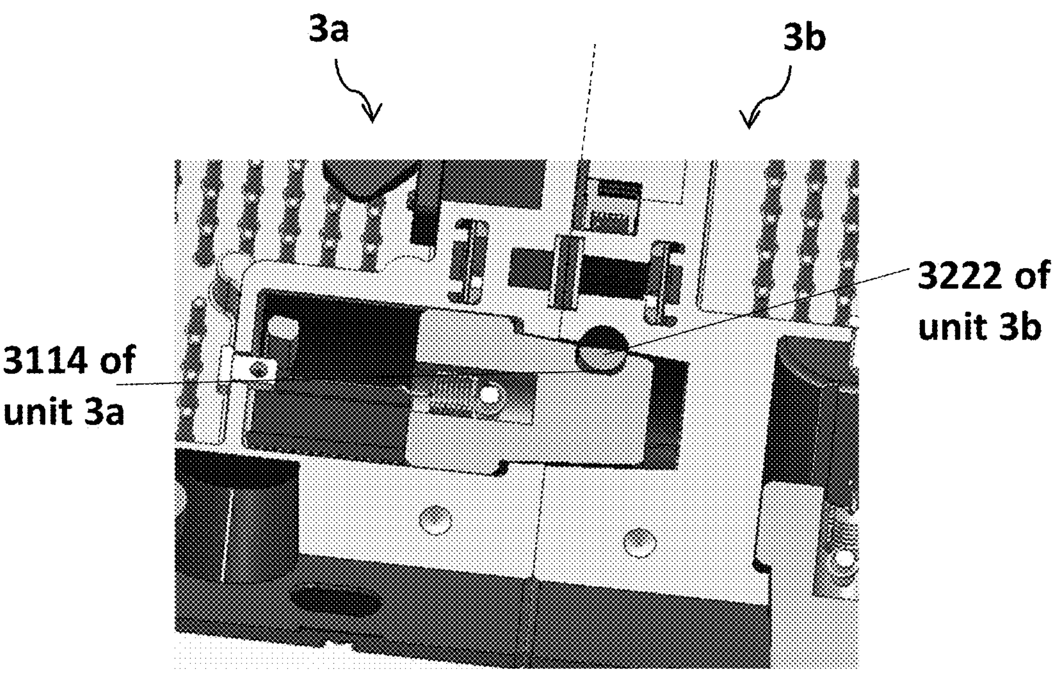

Similar to the male interlock assembly 31, the female interlock assembly 32 may have two locking pins (not shown). The two locking pins are inserted into a first pair of locking holes (not shown) on the housing when the rotatable lever 323 is in the first position. When the lever 323 is lifted up slightly to rotate to a second position, and the locking pins are moved out of the first locking holes and inserted into a second pair of locking holes on the housing when the rotatable lever 323 is in the second position. The securing spring 325 is configured to provide a preload force to secure the two locking pins in the first pair of locking holes or the second pair of locking holes FIGS. 31A to 31D show how two solid-state lighting units 3*a* and 3*b* are interlocked with each other. As shown, after the movable latch 311 of unit 3*a* is protruded by rotating the male rotatable lever 313 of unit 3*a* and inserted into the receiving hole 321 of the unit 3*b*, the locking shaft 322 of the unit 3*b* may be shifted by rotating the female rotatable lever 323 of the unit 3*b* from a first position (as shown in FIG. 31A) to a second position (as shown in FIG. 31B) such that the semicircular notched lower part 3222 of the locking shaft 322 of the unit 3*b* is engaged with a notch 3114 formed on the movable latch 311 of the unit 3*a* as shown in FIGS. 31C and 31D.

The embodiment was chosen and described in order to best explain the principles of the invention and its practical application, thereby enabling others skilled in the art to understand various embodiments of the invention and various embodiments as are suited to the particular use contemplated, kind of modification. Although the devices disclosed herein have been described with reference to specific structures, shapes, materials, compositions of matter and relationships, etc., such descriptions and illustrations are not limiting. Modifications may be made to adapt a particular situation to the aim, spirit and scope of the disclosure. All such modifications are intended to come within the scope of the claims appended hereto.

The invention claimed is:

1. A solid-state lighting unit capable of communicating with one or more adjacent lighting units, comprising:
- a housing;
- a front cover arranged on a front side of the housing;
- a plurality of light sources arranged on a circuit board;
- a control panel arranged on a back side of the housing;
- a driving module electrically connected to the plurality of light sources;
- one or more inter-unit communication modules, each located on a corresponding side of the solid-state lighting unit and configured to communicate with an inter-unit communication module of a corresponding adjacent lighting unit connected to the solid-state lighting unit on the corresponding side; wherein each inter-unit communication module comprises: a presence detector for detecting presence of the corresponding adjacent lighting unit; a presence indicator for indicating the presence of the corresponding adjacent lighting unit; a transceiver for communicating with a corresponding optical transceiver in the corresponding adjacent lighting unit;
- one or more male interlocking assemblies, each located on a corresponding side of the solid-state lighting unit and configured to interlock with a female interlocking assembly of a corresponding adjacent lighting unit connected to the solid-state lighting unit on the corresponding side; and
- one or more female interlocking assemblies, each located on a corresponding side of the solid-state lighting unit and configured to interlock with a male interlocking assembly of a corresponding adjacent lighting unit connected to the solid-state lighting unit on the corresponding side.

2. The solid-state lighting unit according to claim 1, wherein:
- each male interlocking assembly includes a movable latch, a rotatable lever, a cam, a connection shaft and a retraction spring;
- the connection shaft connects the rotatable lever to the cam such that the movable latch is pushed by the cam from a retracting position when the rotatable lever is used to rotate the cam from a first position to a second position;
- the retraction spring has a first end fixed in the housing and a second end fixed in a rear part of the movable latch such that the movable latch is pulled by a preload force exerted by the retraction spring from the protruding position to the retracting position when the rotatable lever is used to rotate the cam from the second position to the first position.

3. The solid-state lighting unit according to claim 2, wherein
- the movable latch has a protruding section which is protruded out of the solid-state lighting unit when the movable latch is in the protruding position; and
- the movable latch further has a notch cut into one side of the protruding section and configured to lock with a locking shaft of the female interlock assembly of the corresponding adjacent lighting unit.

4. The solid-state lighting unit according to claim 3, wherein:

the male interlock assembly further includes two locking pins;

the two locking pins are inserted into a first pair of locking holes in the housing when the rotatable lever is in the first position; and the two locking pins are inserted into a second pair of locking holes in the housing when the rotatable lever is in the second position.

5. The solid-state lighting unit according to claim 4, wherein the male interlock assembly further includes a securing spring configured to provide a preload force to secure the two locking pins in the first pair of locking holes or the second pair of locking holes.

6. The solid-state lighting unit according to claim 1, wherein each female interlocking assembly includes a receiving hole configured to receive a protruding section of a movable latch of the male interlock assembly of the corresponding adjacent lighting unit.

7. The solid-state lighting unit according to claim 6, wherein:

the female interlocking assembly further includes a rotatable lever and a locking shaft connected to the rotatable lever; and the locking shaft has a semicircular notched part such that the semicircular notched part is engaged with a notch on the movable latch of the corresponding adjacent lighting unit when the rotatable lever is used to rotate the locking shaft from a first position to a second position and the semicircular notched part of the locking shaft is released from the notch on the movable latch of the corresponding adjacent lighting unit when the rotatable lever is used to rotate the locking shaft from the second position to the first position.

8. The solid-state lighting unit according to claim 7, wherein:

the female interlock assembly further includes two locking pins;

the two locking pins are inserted into a first pair of locking holes in the housing when the rotatable lever is in the first position; and the two locking pins are inserted into a second pair of locking holes in the housing when the rotatable lever is in the second position.

9. The solid-state lighting unit according to claim 8, wherein the female interlock assembly further includes a securing spring configured to provide a preload force to secure the two locking pins in the first pair of locking holes or the second pair of locking holes.

* * * * *